(12) United States Patent
Raghavan et al.

(10) Patent No.: US 12,335,935 B2
(45) Date of Patent: *Jun. 17, 2025

(54) BEAMFORMING PARAMETER ADAPTATION TECHNIQUES FOR WIRELESS COMMUNICATIONS SYSTEMS

(71) Applicant: QUALCOMM Incorporated, San Diego, CA (US)

(72) Inventors: Vasanthan Raghavan, West Windsor Township, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,115

(22) Filed: Oct. 12, 2023

(65) Prior Publication Data

US 2024/0163856 A1    May 16, 2024

Related U.S. Application Data

(63) Continuation of application No. 17/493,135, filed on Oct. 4, 2021, now Pat. No. 11,800,504.

(Continued)

(51) Int. Cl.
*H04W 72/0453* (2023.01)
*H04B 7/0456* (2017.01)
(Continued)

(52) U.S. Cl.
CPC ...... *H04W 72/0453* (2013.01); *H04B 7/0456* (2013.01); *H04W 24/10* (2013.01); *H04W 72/56* (2023.01)

(58) Field of Classification Search
CPC . H04W 72/0453; H04W 24/10; H04W 72/56; H04W 36/0058; H04B 7/0456;
(Continued)

(56) References Cited

U.S. PATENT DOCUMENTS

2020/0228182 A1   7/2020  Nilsson et al.
2021/0067225 A1*  3/2021  Mo ................... H04B 7/0695
(Continued)

FOREIGN PATENT DOCUMENTS

EP        2823579 B1 *  5/2022  ............. H04B 17/00

OTHER PUBLICATIONS

International Preliminary Report on Patentability—PCT/US2021/053527—The International Bureau of WIPO—Geneva, Switzerland—Apr. 27, 2023.
International Search Report and Written Opinion—PCT/US2021/053527—ISA/EPO—Feb. 10, 2022.
(Continued)

*Primary Examiner* — Thai Nguyen
(74) *Attorney, Agent, or Firm* — Arun Swain

(57) ABSTRACT

This disclosure provides systems, methods and apparatus, including computer programs encoded on computer storage media, for beamforming parameter adaptation techniques. In one aspect, a first wireless device may receive a capability message from at least a second wireless device in a wireless communications system, the capability message indicating a default operating frequency of the second wireless device, a default operating frequency priority of the second wireless device, or both. That is, the second wireless device may transmit the capability message. The first wireless device may transmit, and at least the second wireless device may receive, an indication of the one or more codebook parameters. The one or more codebook parameters may indicate a default operating frequency for the wireless communications system. The first wireless device and the second wireless device may communicate with at least the second (Continued)

wireless device in accordance with the one or more codebook parameters.

30 Claims, 13 Drawing Sheets

Related U.S. Application Data

(60) Provisional application No. 63/092,965, filed on Oct. 16, 2020.

(51) Int. Cl.
*H04W 24/10* (2009.01)
*H04W 72/56* (2023.01)

(58) Field of Classification Search
CPC ...... H04B 7/088; H04B 7/0695; H04B 7/046; H04B 7/0626; H04L 27/2646; H04L 5/0037; H04L 5/0064

See application file for complete search history.

(56) References Cited

U.S. PATENT DOCUMENTS

| 2022/0124714 A1 | 4/2022 | Raghavan et al. |
| 2022/0200767 A1* | 6/2022 | Park ..................... H04B 7/0417 |

OTHER PUBLICATIONS

Moderator (ATT) : "Summary of Email Discussion/Approval [101-e-NR-eMIMO-UEFeature-01]", 3GPP Draft, 3GPP TSG RAN WG1 #101, R1-2005033, 3rd Generation Partnership Project (3GPP), Mobile Competence Centre, 650, Route Des Lucioles, F-06921 Sophia-Antipolis Cedex, France, vol. RAN WG1, No. e-Meeting, May 25-Jun. 5, 2020, Jun. 8, 2020 (Jun. 8, 2020), XP051894371, 17 Pages, page 5.

Samsung: "V2X Multi-Carrier Operation: Sidelink UE Information Enhancement", 3GPP Draft, R2-1701356, 3GPP TSG-RAN WG2 #97, Inter-Carrier SL UE Information Enhancement, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 13-Feb. 17, 2017, Feb. 12, 2017 (Feb. 12, 2017), XP051212018, 2 Pages, The Whole Document.

\* cited by examiner

BEAMFORMING PARAMETER ADAPTATION TECHNIQUES FOR WIRELESS COMMUNICATIONS SYSTEMS

CROSS REFERENCE TO RELATED APPLICATIONS

This application is a continuation of U.S. Non-Provisional application Ser. No. 17/493,135, entitled "BEAMFORMING PARAMETER ADAPTATION TECHNIQUES FOR WIRELESS COMMUNICATIONS SYSTEMS", filed Oct. 4, 2021, which claims the benefit of U.S. Provisional Patent Application No. 63/092,965 by RAGHAVAN et al., entitled "BEAMFORMING PARAMETER ADAPTATION TECHNIQUES FOR WIRELESS COMMUNICATIONS SYSTEMS," filed Oct. 16, 2020, assigned to the assignee hereof, and expressly incorporated in its entirety by reference herein.

TECHNICAL FIELD

The following relates to wireless communications, including beamforming parameter adaptation techniques for wireless communications systems.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support beamformed communications using one or multiple antenna arrays. However, communications performance over some frequency ranges may be relatively inefficient.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication at a first wireless device. The apparatus can include a first interface, a second interface, and a processing system. In some implementations, the first interface can be configured to obtain a capability message from at least a second wireless device in a wireless communications system, the capability message indicating a default operating frequency of the second wireless device, a default operating frequency priority of the second wireless device, or both, and the processing system can be configured to select one or more codebook parameters associated with the capability message, the one or more codebook parameters indicating a default operating frequency for the wireless communications system, and the second interface can be configured to output, to at least the second wireless device, an indication of the one or more codebook parameters.

Another innovative aspect of the subject matter described in this disclosure can be implemented in another apparatus for wireless communication at a first wireless device. In some implementations, the apparatus can include a processor, memory coupled with the processor, and instructions stored in the memory. The instructions may be executable by the processor to cause the apparatus to receive, at the first wireless device, a capability message from at least a second wireless device in a wireless communications system, the capability message indicating a default operating frequency of the second wireless device, a default operating frequency priority of the second wireless device, or both, select one or more codebook parameters associated with the capability message, the one or more codebook parameters indicating a default operating frequency for the wireless communications system, and transmit, to at least the second wireless device, an indication of the one or more codebook parameters.

Another innovative aspect of the subject matter described in this disclosure can be implemented in a method of wireless communications at a first wireless device. In some implementations, the method can include receiving, at a first wireless device, a capability message from at least a second wireless device in a wireless communications system, the capability message indicating a default operating frequency of the second wireless device, a default operating frequency priority of the second wireless device, or both, selecting one or more codebook parameters associated with the capability message, the one or more codebook parameters indicating a default operating frequency for the wireless communications system, and transmitting, to at least the second wireless device, an indication of the one or more codebook parameters.

Another innovative aspect of the subject matter described in this disclosure can be implemented in another apparatus for wireless communication at a first wireless device. In some implementations, the apparatus can include means for receiving, at the first wireless device, a capability message from at least a second wireless device in a wireless communications system, the capability message indicating a default operating frequency of the second wireless device, a default operating frequency priority of the second wireless device, or both, selecting one or more codebook parameters associated with the capability message, the one or more codebook parameters indicating a default operating frequency for the wireless communications system, and transmitting, to at least the second wireless device, an indication of the one or more codebook parameters.

Another innovative aspect of the subject matter described in this disclosure can be implemented in a non-transitory computer-readable medium storing code for wireless communication at a first wireless device. In some implementations, the code can include instructions executable by a processor to receive, at a first wireless device, a capability message from at least a second wireless device in a wireless communications system, the capability message indicating a default operating frequency of the second wireless device, a default operating frequency priority of the second wireless device, or both, select one or more codebook parameters associated with the capability message, the one or more codebook parameters indicating a default operating frequency for the wireless communications system, and transmit, to at least the second wireless device, an indication of the one or more codebook parameters.

In some implementations, the method, apparatuses, and non-transitory computer-readable medium can include operations, features, means, or instructions for determining a set of relay UEs including the relay UE associated with (such as in response to or based on) receiving the control signaling, establishing communications links with one or more relay UEs of the set of relay UEs associated with determining the set of relay UEs, determining an activated subset of relay UEs in the set of relay UEs associated with establishing the communications links, the activated subset of relay UEs including the relay UE, and communicating with the BS via the activated subset of relay UEs associated with determining the activated subset of relay UEs.

In some implementations, the method, apparatuses, and non-transitory computer-readable medium can include operations, features, means, or instructions for receiving one or more reports from at least the second wireless device, the one or more reports indicating a signal to noise ratio for one or more frequencies.

In some implementations, the capability message includes the one or more reports from at least the second wireless device.

In some implementations, the method, apparatuses, and non-transitory computer-readable medium can include operations, features, means, or instructions for transmitting control signaling to at least the second wireless device, the control signaling configuring the one or more frequencies associated with the one or more reports.

In some implementations, communicating with at least the second wireless device may include operations, features, means, or instructions for communicating with at least the second wireless device in accordance with the one or more codebook parameters, and communicating using the default operating frequency for the wireless communications system.

In some implementations, the method, apparatuses, and non-transitory computer-readable medium can include operations, features, means, or instructions for adjusting a first default operating frequency of the first wireless device to the default operating frequency for the wireless communications system associated with the one or more codebook parameters.

In some implementations, the method, apparatuses, and non-transitory computer-readable medium can include operations, features, means, or instructions for transmitting a request for the capability message to at least the second wireless device, where receiving the capability message may be associated with transmitting the request.

In some implementations, the method, apparatuses, and non-transitory computer-readable medium can include operations, features, means, or instructions for receiving a set of capability messages from a set of wireless devices, the set of capability messages including the capability message from the second wireless device.

In some implementations, the method, apparatuses, and non-transitory computer-readable medium can include operations, features, means, or instructions for selecting the default operating frequency for the wireless communications system associated with a majority of the set of capability messages indicating the default operating frequency for the wireless communications system.

In some implementations, the method, apparatuses, and non-transitory computer-readable medium can include operations, features, means, or instructions for selecting the default operating frequency for the wireless communications system associated with a set of default operating frequency priorities including a respective operating frequency priority associated with each wireless device of the set of wireless devices, where the set of default operating frequency priorities includes the default operating frequency priority of the second wireless device.

In some implementations, the method, apparatuses, and non-transitory computer-readable medium can include operations, features, means, or instructions for selecting the default operating frequency for the wireless communications system associated with a set of default operating frequencies including a respective default operating frequency associated with each wireless device of the set of wireless devices, where the set of default operating frequencies includes the default operating frequency of the second wireless device.

In some implementations, the method, apparatuses, and non-transitory computer-readable medium can include operations, features, means, or instructions for assigning the default operating frequency priority of the second wireless device to at least the second wireless device.

In some implementations, the default operating frequency priority of the second wireless device corresponds to a capability of the second wireless device.

Another innovative aspect of the subject matter described in this disclosure can be implemented in an apparatus for wireless communication at a second wireless device. The apparatus can include a first interface, a second interface, and a processing system. In some implementations, the second interface can be configured to output a capability message to a first wireless device in a wireless communications system, the capability message indicating a default operating frequency of the second wireless device, a default operating frequency priority of the second wireless device, or both. The first interface can be configured to obtain, from the first wireless device, an indication of one or more codebook parameters associated with the capability message, the one or more codebook parameters indicating a default operating frequency for the wireless communications system. The second interface can be configured to communicate with the first wireless device in accordance with the one or more codebook parameters.

Another innovative aspect of the subject matter described in this disclosure can be implemented in a method of wireless communications at a second wireless device. In some implementations, the method can include transmitting a capability message to a first wireless device in a wireless communications system, the capability message indicating a default operating frequency of a second wireless device, a default operating frequency priority of the second wireless device, or both, receiving, from the first wireless device, an indication of one or more codebook parameters associated with the capability message, the one or more codebook parameters indicating a default operating frequency for the wireless communications system, and communicating with the first wireless device in accordance with the one or more codebook parameters.

Another innovative aspect of the subject matter described in this disclosure can be implemented in another apparatus for wireless communication at a second wireless device. In some implementations, the apparatus can include means for transmitting a capability message to a first wireless device in a wireless communications system, the capability message indicating a default operating frequency of a second wireless device, a default operating frequency priority of the second wireless device, or both, receiving, from the first wireless device, an indication of one or more codebook parameters associated with the capability message, the one or more codebook parameters indicating a default operating frequency for the wireless communications system, and communicating with the first wireless device in accordance with the one or more codebook parameters.

Another innovative aspect of the subject matter described in this disclosure can be implemented in a non-transitory computer-readable medium storing code for wireless communication at a second wireless device. In some implementations, the code can include instructions executable by a processor to transmit a capability message to a first wireless device in a wireless communications system, the capability message indicating a default operating frequency of a second wireless device, a default operating frequency priority of the second wireless device, or both, receive, from the first wireless device, an indication of one or more codebook parameters associated with the capability message, the one or more codebook parameters indicating a default operating frequency for the wireless communications system, and communicate with the first wireless device in accordance with the one or more codebook parameters.

In some implementations, the method, apparatuses, and non-transitory computer-readable medium can include operations, features, means, or instructions for transmitting one or more reports to the first wireless device, the one or more reports indicating a signal to noise ratio for one or more frequencies.

In some implementations, the method, apparatuses, and non-transitory computer-readable medium can include operations, features, means, or instructions for receiving control signaling to at least the second wireless device, the control signaling configuring the one or more frequencies associated with the one or more reports.

In some implementations, the method, apparatuses, and non-transitory computer-readable medium can include operations, features, means, or instructions for determining the one or more codebook parameters associated with receiving the indication.

In some implementations, the method, apparatuses, and non-transitory computer-readable medium can include operations, features, means, or instructions for adjusting a first default operating frequency of the second wireless device to the default operating frequency for the wireless communications system associated with receiving the indication.

In some implementations, communicating with the first wireless device further may include operations, features, means, or instructions for communicating with at least the second wireless device in accordance with the one or more codebook parameters, and communicating using the default operating frequency for the wireless communications system.

In some implementations, the method, apparatuses, and non-transitory computer-readable medium can include operations, features, means, or instructions for receiving a request for the capability message from the first wireless device, where transmitting the capability message may be associated with the request for the capability message.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
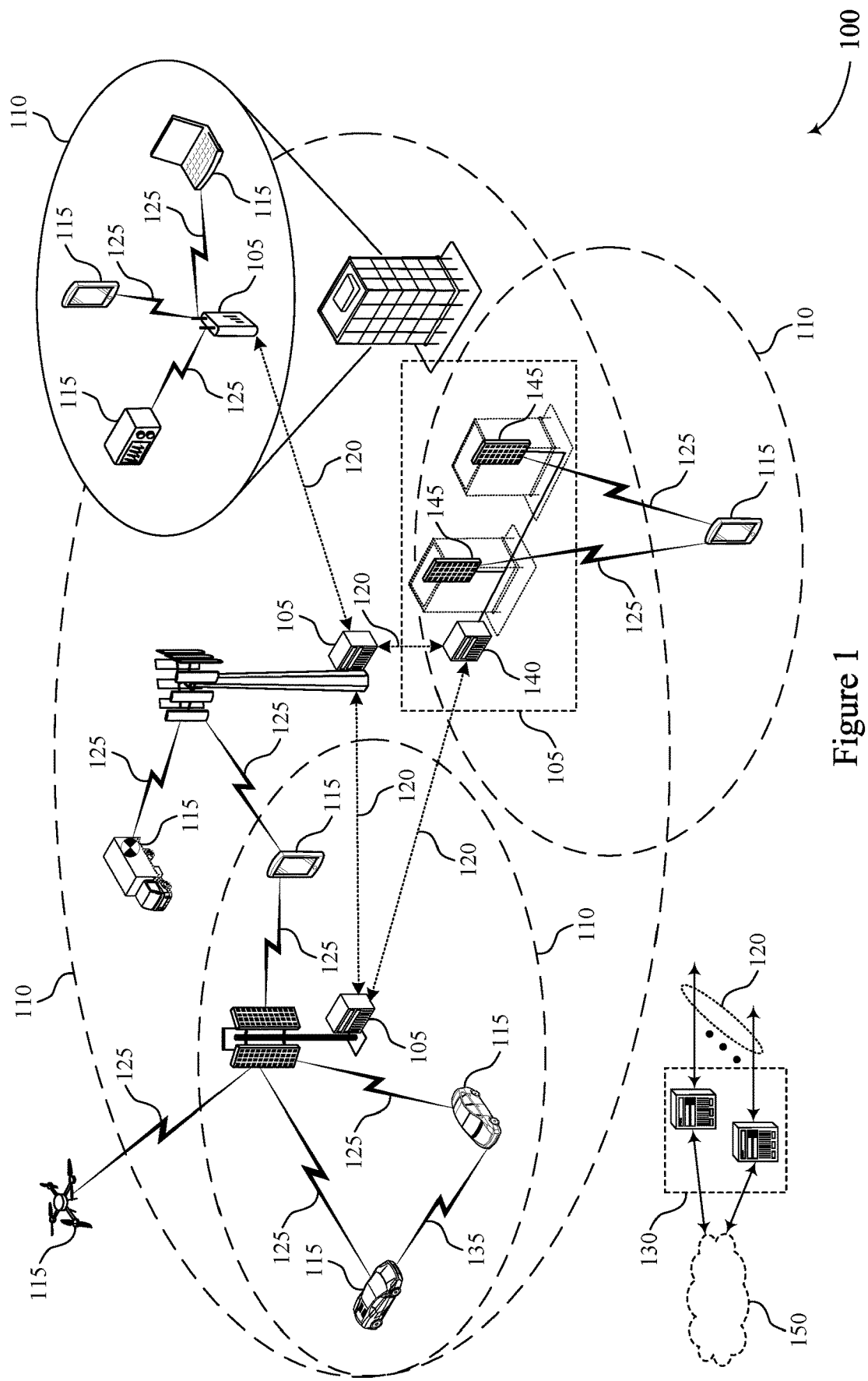
FIG. 1 shows an example of a wireless communications system that supports beamforming parameter adaptation techniques.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Some wireless communications systems may support wireless communications in relatively high frequency ranges, such as in frequency range 4 (FR4) (for example, including 52.6 gigahertz (GHz)-114.25 GHz bands), which may be referred to as upper millimeter wave (mmW) bands, a sub-terahertz (THz) regime, or the like. Sometimes the term sub-terahertz can be used to denote bands up to 300 GHz. Communications in such frequency ranges may utilize an ultra-wide bandwidth (for example, a 14 GHz bandwidth, a 25 GHz bandwidth, a bandwidth greater than 3 GHz, or the like), which may enable enhanced communications performance at the corresponding frequencies. However, a wireless device (such as a user equipment (UE), a base station or a fifth generation base station (BS or gNB), or the like) may have limited capability for simultaneous communications over all bands or frequencies of the ultra-wide bandwidth. As an example, a single RF chain for an antenna array at the wireless device may be used for the entire ultra-wide bandwidth, but the RF chain may have a hardware configuration (for example, a single set of phase shifters and gain control, an antenna element spacing) suited for beamforming at a number of frequencies within the bandwidth but relatively inefficient in terms of array gain for other frequencies. Communications performance at these other frequencies within the ultra-wide bandwidth may thus be constrained by the configuration of the array, as well as a number of RF chains, of the device. For example, a system may include multiple devices operating at various default operating frequencies. A serving device of the system may have a respective default operating frequency different than the default operating frequencies of the other devices, which may result in inefficient beamforming for communications in the system (for example, beam shape distortion of main, side, and grating lobes and nulls at such other frequencies, which may be referred to as beam squinting, may impact performance of the system).

Accordingly, wireless devices may implement beamforming parameter adaptation techniques as described herein, which may reduce beamforming array gain deterioration and improve communications efficiency in the system, among other benefits. For example, a wireless device may receive one or more capability messages from other wireless devices in a system. The one or more capability messages may indicate a default operating frequency of a respective wireless device. In some examples, the default operating frequencies may be device-specific and may be associated with a hardware configuration (for example, a number of RF chains, antenna element spacing) for communications over an ultra-wide bandwidth.

The wireless device may select one or more codebook parameters associated with the received one or more capability messages. For example, the wireless device may determine a default operating frequency for the system and select one or more codebook parameters corresponding to the determined default operating frequency. In some examples, the wireless device may determine the default operating frequency for the system associated with a majority scheme. As an example, the wireless device may determine a frequency value associated with a majority of the wireless devices in the system (for example, the wireless device may adjust the codebook parameters such that the default operating frequency for the system corresponds to a default operating frequency reported by the majority of wireless devices). Additionally, or alternatively, the wireless device may determine the default operating frequency for the system associated with a priority scheme. As an example, the wireless device may configure a priority indicator for one or more other wireless devices (for example, a priority may be assigned to each device associated with the capability of the device indicated by the capability messages). The wireless device may select a frequency value associated with the priorities of the various devices. The wireless device may indicate the default operating frequency for the system to the other wireless devices (for example, the wireless device may indicate the selected one or more codebook parameters). The wireless devices in the system may communicate over the bandwidth associated with the one or more codebook parameters.

Particular implementations of the subject matter described in this disclosure can be implemented to realize one or more of the following potential advantages. Adjusting codebook parameters in accordance with a determined default operating frequency for the system may provide for more efficient communications between devices, and may reduce array gain deterioration due to beam shape distortion. Additionally, or alternatively, a wireless device serving the system may be enabled to select a default operating frequency for the system associated with a relatively high performance for a majority of devices, relatively high priority devices, or a combination thereof, which may result in increased throughput and higher reliability, or increased system efficiency.

FIG. 1 shows an example wireless communications system 100 that supports beamforming parameter adaptation techniques. The wireless communications system 100 may support beamforming parameter adaptation techniques for wireless communications systems. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (such as mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (such as core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (such as via an S1, N2, N3, or another interface). The base stations 105 may communicate with one another over the backhaul links 120

(such as via an X2, Xn, or other interface) either directly (such as directly between base stations 105), or indirectly (such as via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (such as a duration of one modulation symbol) and one subcarrier, where the symbol period and subcarrier spacing are inversely related. The number of bits carried by each resource element may depend on the modulation scheme (such as the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (such as spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some examples, a frame may be divided (such as in the time domain) into subframes, and each subframe may be further divided into a number of slots. Alternatively, each frame may include a variable number of slots, and the number of slots may depend on subcarrier spacing. Each slot may include a number of symbol periods (such as depending on the length of the cyclic prefix prepended to each symbol period). In some wireless communications systems 100, a slot may further be divided into multiple mini-slots containing one or more symbols. Excluding the cyclic prefix, each symbol period may contain one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some examples, the TTI duration (such as the number of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a number of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (such as mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 also may be able to communicate directly with other UEs 115 over a device-to-device (D2D) communication link 135 (such as using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other implementations, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (such as radio heads and ANCs) or consolidated into a single network device (such as a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (such as less than 100 kilometers) compared to transmission using the smaller frequencies and longer waves of the high frequency (HF) or very high frequency (VHF) portion of the spectrum below 300 MHz.

The wireless communications system 100 also may operate in a super high frequency (SHF) region using frequency bands from 3 GHz to 30 GHz, also known as the centimeter band, or in an extremely high frequency (EHF) region of the spectrum (such as from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be associated with a carrier aggregation configuration in conjunction with component carriers operating in a licensed band (such as LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (such as the same codeword) or different data streams (such as different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which also may be referred to as spatial filtering, directional transmission, or directional reception, is a signal processing technique that may be used at a transmitting device or a receiving device (such as a base station 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (such as antenna panels) to conduct beamforming operations for directional communications with a UE 115. Some signals (such as synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (such as by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (such as a direction associated with the receiving device, such as a UE 115). In some examples, the beam direction associated with transmissions along a single beam direction may be determined associated with a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (such as by a base station 105 or a UE 115) may be performed using multiple beam directions, and the device may use a combination of digital precoding or radio frequency beamforming to generate a combined beam for transmission (such as from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (such as a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (such as a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (such as for identifying a beam direction for subsequent transmission or reception by the UE 115) or for transmitting a signal in a single direction (such as for transmitting data to a receiving device).

A receiving device (such as a UE 115) may try multiple receive configurations (such as directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (such as different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (such as when receiving a data signal). The single receive configuration may be aligned in a beam direction determined associated with listening according to different receive configuration directions (such as a beam direction determined to have a highest signal strength, highest signal-to-noise ratio (SNR), or otherwise acceptable signal quality associated with listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer also may use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In the wireless communications system 100, one or more UEs 115 and base stations 105 may communicate in an ultra-wide bandwidth (such as a 14 GHz bandwidth, a 25 GHz bandwidth, or some bandwidth that is greater than 3 GHz). However, a UE 115 may be configured (for example, with a hardware/antenna configuration) with a default operating frequency that may be different than default operating frequencies of other devices in the system (for example, other UEs 115 or base stations 105), which may result in reduced performance in the system. Accordingly, a serving wireless device (for example, a base station 105 or a UE 115) may identify a default operating frequency for the system associated with a majority scheme, a priority scheme, or a combination thereof. The wireless device may adjust one or more codebook parameters (for example, the wireless device may adjust the hardware or antenna configuration by changing via beamforming parameters of a codebook) such that the wireless device communicates using the system default operating frequency. The wireless device may indicate the default operating frequency for the system to other devices. Such an indication may be transmitted via RRC signaling, control signaling, or the like. The UEs 115 and base stations 105 may communicate over the ultra-wide bandwidth associated with the indicated codebook parameters.

Figure 2:
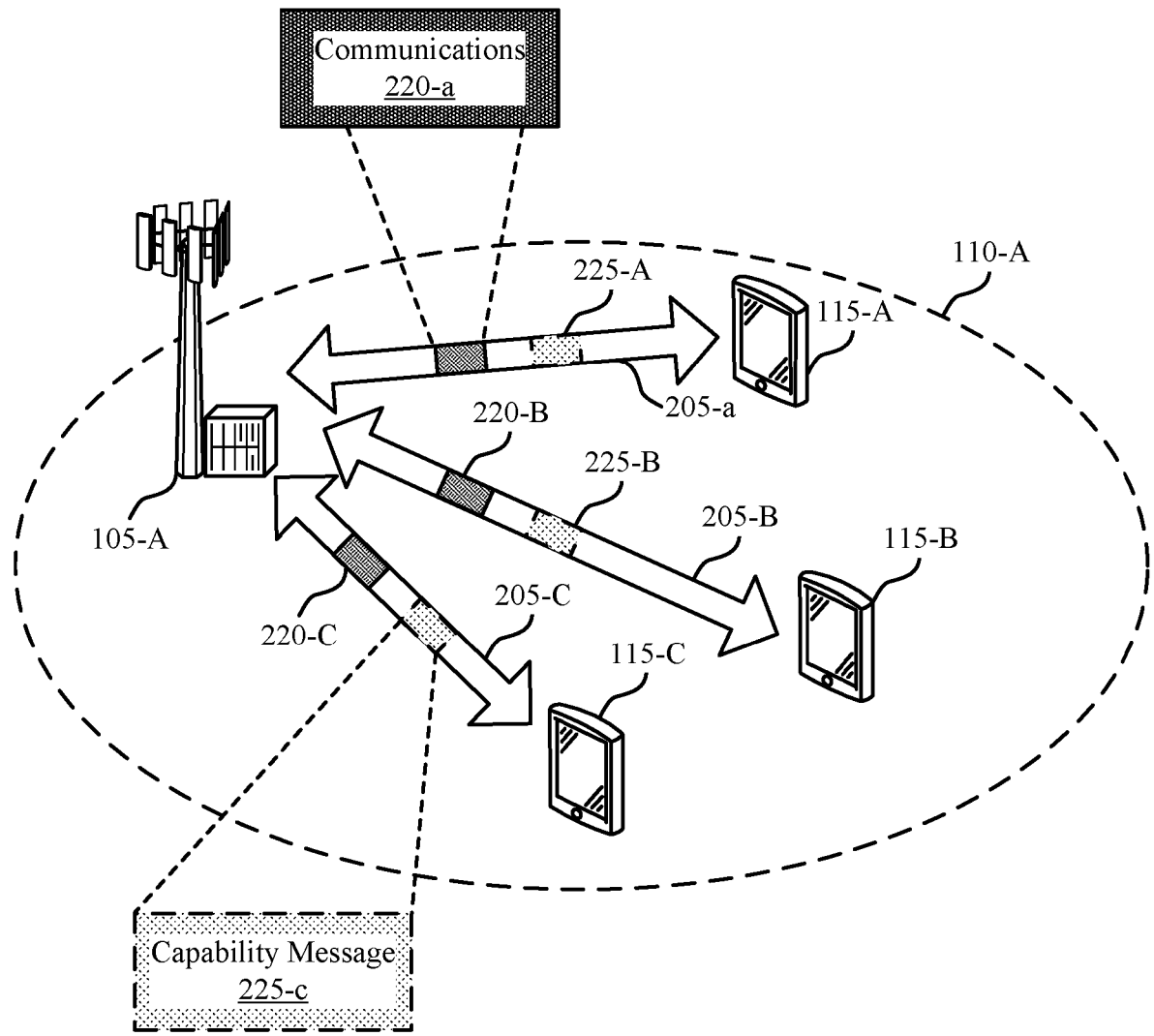
FIG. 2 shows an example of a signaling diagram that supports beamforming parameter adaptation techniques.

FIG. 2 shows an example of a signaling diagram 200 that supports beamforming parameter adaptation techniques. The signaling diagram 200 may support beamforming parameter adaptation techniques for wireless communications systems. In some examples, the signaling diagram 200 may implement aspects of the wireless communications system 100. For example, the signaling diagram 200 includes a UE 115-*a* and a base station 105-*a*, which may be examples of a UE 115 and base station 105, respectively, described with reference to FIG. 1, among other examples of wireless nodes. It is to be understood that references to specific wireless devices (for example, UEs or base stations) in the below figures are provided for illustrative purposes, and different wireless devices not specifically referred to herein may be used interchangeably with those described herein (for example, the described techniques may be implemented by infra nodes, small cell nodes, integrated access and backhaul (IAB) nodes, repeaters, or any combination thereof, among other examples of wireless nodes). Likewise, the described operations performed by a UE may, in some implementations, be performed by a base station, and vice versa.

The base station 105-*a* may communicate with the UEs 115 via communication links 205, which may be examples of communication links 125 as described with reference to FIG. 1. For example, the base station 105-*a* and the UE 115-*a* may transmit or receive communications 220-*a* in relatively high frequency ranges, such as in frequency range 4 (FR4) (for example, including 52.6 gigahertz GHz-114.25 GHz bands), which may be referred to as upper mmW bands or a sub-THz regime, among other examples. In some implementations, at upper millimeter wave bands a device may implement relatively more antenna elements packed in a same physical aperture in FR4 compared to frequency range 2 (FR2) (for example, FR4 may be associated with relatively large antenna arrays). Communications in such frequency ranges may utilize relatively wide bandwidths (for example, an ultra-wide bandwidth such as 1 GHz bandwidth, a 25 GHz bandwidth, a bandwidth greater than 3 GHz, or the like), which may increase performance and beamforming gains.

In some implementations, a single RF chain for an antenna array at a wireless device may be used for the entire bandwidth. In such implementations, the RF chain may have a hardware configuration (for example, a single set of phase shifters and gain control, an inter-antenna element spacing) suited for beamforming at some frequencies. For example, an inter-antenna element spacing may be fixed at a value that may provide relatively high beamforming array gain and performance at some frequencies (for example, a default operating frequency associated with a relatively high array gain). Such default operating frequencies may be a result of a hardware configuration of the corresponding device. For example, the UE 115-*a* may include hardware configured to perform beamforming with a number of RF chains over an antenna array. The antenna array setup may include a fixed inter-antenna element spacing, a single set of phase shifters (for example, if the UE 115-*a* utilizes a single RF chain), or both, which may result in operation at a default operating frequency for the UE 115-*a* (for example, 70 GHz).

In some implementations, a wireless device may determine a default operating frequency corresponding to the wireless device. The wireless device may be configured with the default operating frequency for a respective carrier frequency. For example, the default operating frequency may be a frequency at which an array gain is maximized for a carrier frequency (for example, an antenna array may have an inter-element spacing represented as $$d = \frac{\lambda}{2},$$

where $\lambda$ represents the carrier wavelength, for the default operating frequency). The default operating frequency may be device specific, RF chain specific, or a combination thereof. The default operating frequency may correspond to one or more parameters of a codebook at the wireless device. For example, a wireless device may perform analog/RF beamforming with a limited number of RF chains over an antenna array (made from one or more antenna panels) of the wireless device. An analog/RF beamforming codebook may be relatively efficient for some carrier frequencies over an ultra-wide bandwidth, such as the default operating frequency. In some examples, the parameters of the codebook may be referred to as codebook entries. The parameters of the codebook may include phase shifters and gain controls.

In some examples, the signaling diagram 200 may include multiple devices operating at different default operating frequencies (for example, each device may be designed with different antenna array setups and a same or different frequency for analog/RF beamforming). For example, the base station 105-a may be a serving device of the system and may operate at a first default operating frequency (for example, a baseline analog/RF beamforming codebook configured at the base station 105-a may be tuned to a default operating frequency of 71 GHz). The UE 115-a, the UE 115-b, and the UE 115-c may operate at one or more other frequencies (for example, the UE 115-a may operate at a default operating frequency of 70 GHz, the UE 115-b may operate at a default operating frequency of 57 GHz, and the UE 115-c may operate at a default operating frequency of 63 GHz, although any quantity of UEs 115 or default operating frequencies is possible). In some examples, if the base station 105-a sends communications 220 using the default operating frequency of the base station 105-a, the UEs 115 with different default operating frequencies may experience relatively poor beamforming performance, which may result in inefficient communications 220. For example, communicating via a frequency different than a default operating frequency may result in beam squinting. As an illustrative example, the UE 115-b may have a default operating frequency of 57 GHz and may experience a loss in beamforming performance when communicating at the default operating frequency of the base station 105-a of 71 GHz. The UE 115-a, however, may have a default operating frequency of 70 GHz and may experience relatively efficient communications when communicating at the default operating frequency of the base station 105-a.

Accordingly, the techniques described herein may enable a serving device, such as the base station 105-a, to determine a default operating frequency for the signaling diagram 200 associated with the default operating frequencies of the UEs 115. For example, the base station 105-a may adapt its codebook parameters to serve the UEs 115 with the determined default operating frequency, which may enhance an overall performance of the signaling diagram 200.

The base station 105-a may identify the default operating frequencies of the UEs 115. For example, each UE 115 may broadcast or otherwise share their respective default operating frequencies with the base station 105-a. For example, the UE 115-a may send a capability message 225-a indicating the default operating frequency of the UE 115-a (for example, via RRC signaling among other examples of control signaling such as medium access control (MAC) control element (CE) messaging, information in a downlink control information (DCI) message, or a combination thereof). The base station 105-a may receive the capability messages 225 from one or more UEs 115 and identify the default operating frequencies in response to the messages. In some implementations, the base station 105-a may send, to one or more of the UEs 115, a request message requesting a capability message 225 from the UEs 115. As an example, the UE 115-a may receive a request message and may transmit the capability message 225-a indicating the default operating frequency of the UE 115-a in response to receiving the request message. In some examples, the request message, the capability messages 225, or both may be included in control signaling, such as RRC signaling, MAC-CE messaging, information in a DCI message or an uplink control information (UCI) message, or any combination thereof, among other examples of control signaling.

The base station 105-a may select one or more codebook parameters for a beamforming codebook of one or more devices associated with the identified default operating frequencies. For example, the base station 105-a may determine a frequency at which to tune the analog/RF beamforming codebook of the base station 105-a. For example, the base station 105-a may adjust one or more parameters of the codebook, such as phase shifter parameters, gain control parameters, or a combination thereof, among other examples of codebook parameters, for communications 220 at the determined frequency. Such a frequency may be referred to as a default operating frequency for the system.

The base station 105-a may determine the system default operating frequency associated with the default operating frequencies of the UEs 115. In some examples, the base station 105-a may determine the default operating frequency in accordance with a majority scheme. In one implementation, the base station 105-a may select a default operating frequency (or a relatively close frequency value) associated with the largest quantity of devices serviced by the base station 105-a as the targeted frequency (for example, the system default operating frequency) for the codebook of the base station 105-a. As an illustrative example, the base station 105-a may determine that a majority of the capability messages 225 from the UEs 115 indicate a same default operating frequency (for example, the UE 115-a and the UE 115-b may be associated with a default operating frequency of 71 GHz and the base station 105-a may determine that a system default operating frequency of 71 GHz satisfies the highest quantity of UEs 115 in the system). In some implementations, the base station 105-a may determine the system default operating frequency in response to whether one or more thresholds are satisfied. For example, the base station 105-a may determine that a threshold quantity of UEs 115-a have reported a same or similar default operating frequency (for example, a majority, a configured percentage, a minimum quantity, among other examples of thresholds). The base station 105-a may select the same or similar operating frequency for the wireless communications system in response to determining that the one or more thresholds are satisfied.

Additionally, or alternatively, the base station 105-a may determine the system default operating frequency in accordance with a priority scheme (for example, the determination may be priority-based). In some examples, the base station 105-a may configure a priority indicator for one or more devices in the signaling diagram 200. For example, the base station 105-a may assign a priority or a weighing factor to each UE 115-a (for example, the base station 105-a may assign a set of priorities or weighting factors represented as $w_i$ where $i=1, 2, \ldots N$ for N devices in the signaling diagram 200). In some examples, the priority of a device may be related to or capture a capability of the device. For example, the priority assigned to the UE 115-a may be associated with the capability of the UE 115-a indicated by the capability message 225-a (for example, the UE 115-a may include a default operating frequency priority of the UE 115-a or other parameters of the message may indicate to the base station 105-a the priority of the UE 115-a). Additionally, or alternatively, the priority of the device may be associated with scheduled communications 220 with the device. For example, the base station 105-a may determine that the UE 115-b is associated with a relatively higher data rate for communications 220-b compared to a data rate for the UE 115-c for communications 220-c (for example, the base station 105-*a* may compare the data rate of the UE 115-*b* or other parameters associated with the communications 220-*b* to the data rate of the UE 115-*c* or other parameters associated with the communications 220-*c*). The base station 105-*a* may assign a relatively higher priority or weighting factor to the UE 115-*b* associated with the comparison indicating that the UE 115-*b* corresponds to higher priority communications 220 (for example, low latency parameters). Thus, a device whose default operating frequency matters relatively more to the base station 105-*a* associated with the capability of the device or other factors or both may correspond to a relatively higher priority. In some examples, the priority may be time varying, the priority may be relatively static, the priority may be reset each time a device restarts, or any combination thereof.

In some implementations, the base station 105-*a* may configure one or more devices to report signal measurements. The base station 105-*a* may receive the reported signal measurements for one or more frequencies from the one or more devices and determine the system default operating frequency or the priorities of the devices associated with the reports. For example, the base station 105-*a* may configure a set of sample frequencies (for example, sampling frequencies over an ultra-wide bandwidth) to at least the UE 115-*c* via control signaling, such as RRC signaling. The UE 115-*c* may measure signal variations over each frequency of the configured set of frequencies. For example, the UE 115-*c* may determine an SNR, a signal to interference plus noise ratio (SINR), reference signal received power (RSRP), a reference signal received quality (RSRQ), received signal strength indicator (RSSI), among other examples of signal measurements. The UEs 115 may report such measurements to the base station 105-*a*. For example, a device i may report a respective $SNR_i(f_k)$ where k represents each frequency of the configured set of sampling frequencies (for example, k=1, 2, . . . K when a UE 115 is configured with K frequencies).

The base station 105-*a* may determine the default operating frequency for the system (for example, the default operating frequency for the codebook of at least the base station 105-*a*) associated with the reported information. As merely one illustrative example, the base station 105-*a* may calculate the default frequency for the codebook "Best freq" represented by Equation 1:

$$\text{Best freq} = \text{argmax}_{k=1,2,\ldots K} \Sigma_{i=1}^{N} w_i SNR_i(f_k) \quad (1)$$

In Equation 1, k may represent a frequency k of a configured set of K sampling frequencies, $w_i$ may represent the weighting factor or priority indicator of a device i, and $SNR_i(f_k)$ may represent a SNR measurement of a device i for a frequency k, although any type of signal measurement may be used.

The base station 105-*a* may adjust one or more parameters of a codebook associated with the determined default operating frequency. For example, the base station 105-*a* may adjust the one or more parameters to update beam scanning periodicities, steer beams to different directions and frequencies, among other examples, for communications 220 using the determined default operating frequency for the system. In some examples, the one or more parameters of the codebook may be included in a look-up table or other mapping stored at a device (for example, a matrix of parameters). The base station 105-*a* may apply a transformation from a first matrix (for example, a table of parameters corresponding to a default operating frequency of the base station 105-*a*) to obtain a second matrix (for example, a second table of parameters corresponding to the determined default operating frequency of the system).

The base station 105-*a* may indicate one or more parameters to the UEs 115. For example, the base station 105-*a* may send control signaling or other messaging indicating the adjusted one or more parameters of the codebook. The adjusted one or more parameters may include an indication of the determined default operating frequency for the system. For example, the one or more parameters may indicate that the base station 105-*a* may communicate using the determined default operating frequency.

The UEs 115 may determine the one or more parameters associated with the indication. In some implementations, the UEs 115 may update one or more communications parameters associated with the indicated default operating frequency or parameters. For example, the UE 115-*a* may update its own codebook parameters for communications at the system default operating frequency. Additionally, or alternatively, the UE 115-*a* may adjust other communications parameters, such as a modulation and coding scheme (MCS), uplink rate control parameters, power control parameters, among other examples of parameters. As an illustrative example, the UE 115-*a* may determine that the system default operating frequency at the base station 105-*a* may be different than a default operating frequency of the UE 115-*a*. In such examples, the UE 115-*a* may adjust an MCS in order to improve reliability of communications. For example, the UE 115-*a* may determine that the communications 220-*a* may be relatively less efficient due to the difference between the default operating frequency indicated by the base station 105-*a* and the default operating frequency of the UE 115-*a*, and the UE 115-*a* may select a more robust MCS associated with the determination.

Figure 3:
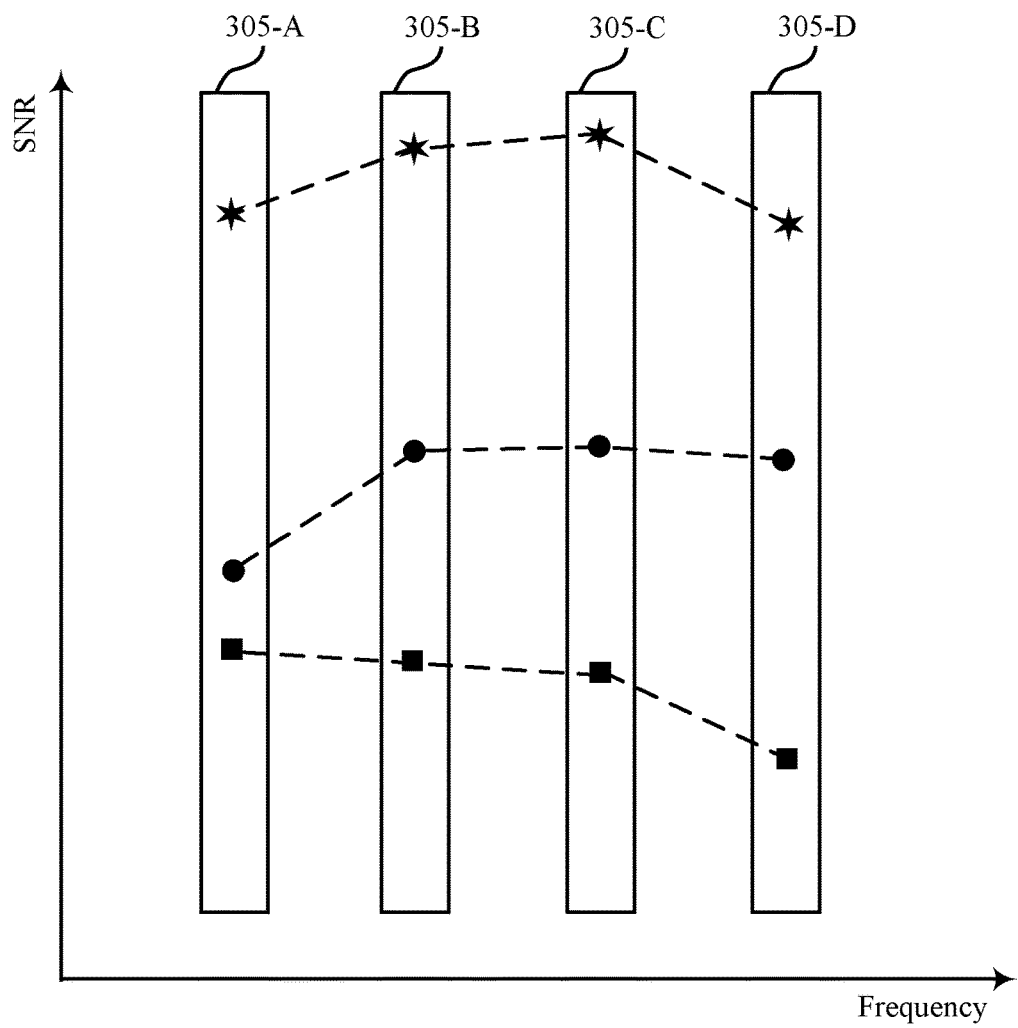
FIG. 3 shows a diagram of an example frequency scheme that supports beamforming parameter adaptation techniques.
Figure 3:
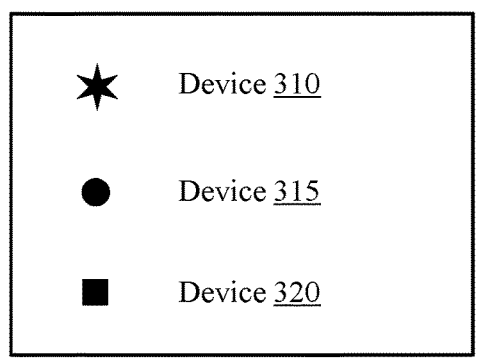

FIG. 3 shows a diagram of an example frequency scheme 300 that supports beamforming parameter adaptation techniques. The frequency scheme 300 may support beamforming parameter adaptation techniques for wireless communications systems. In some examples, the frequency scheme 300 may implement aspects of the wireless communications system 100 or the signaling diagram 200. For example, the frequency scheme 300 may illustrate an example of reported signal measurements for a set of configured frequencies for three wireless devices 310, 315, and 320, which may be examples of the wireless devices as described herein with reference to FIGS. 1 and 2.

Although the frequency scheme 300 may show four frequencies 305 for illustrative clarity, it is to be understood that any quantity of frequencies 305 may be configured as described herein. For example, a serving wireless device may configure the wireless devices 310, 315, and 320 to report measurements for the frequencies 305-*a*, 305-*b*, 305-*c*, and 305-*d*. In some implementations, the serving wireless device may transmit control signaling configuring the set of frequencies 305 (for example, a configured set of sampling frequencies of an ultra-wide frequency band as described with reference to FIG. 2).

The wireless devices 310, 315, and 320 may each determine an SNR for each frequency 305 of the set of frequencies 305, as shown in the frequency scheme 300, although any type of signal measurement may be implemented as described with reference to FIG. 2. As an illustrative example, the wireless device 310 may have a default operating frequency of 60 GHz. The signal measurements for the wireless device 310 may peak at or relatively near the default operating frequency (for example, frequency 305-*c* may be 60 GHz) and may be relatively lower at other frequencies 305 (for example, the signal measurement may drop off at frequency 305-d, such as 71 GHz, depending on properties of the device such as the default operating frequency as described herein).

The wireless devices 310, 315, and 320 may report the determined measurements to the serving wireless device. The serving wireless device may select one or more codebook parameters associated with the reported information as described with reference to FIG. 2. For example, the serving wireless device may determine a default operating frequency for the system associated with the reports transmitted by each of the wireless devices 310, 315, and 320. In some examples, such reporting may be a part of a beam training procedure or other beam sweeping procedures performed by the serving wireless device. The serving wireless device may indicate the one or more parameters of a codebook of the serving wireless device associated with the determination as described with reference to FIG. 2.

Figure 4:
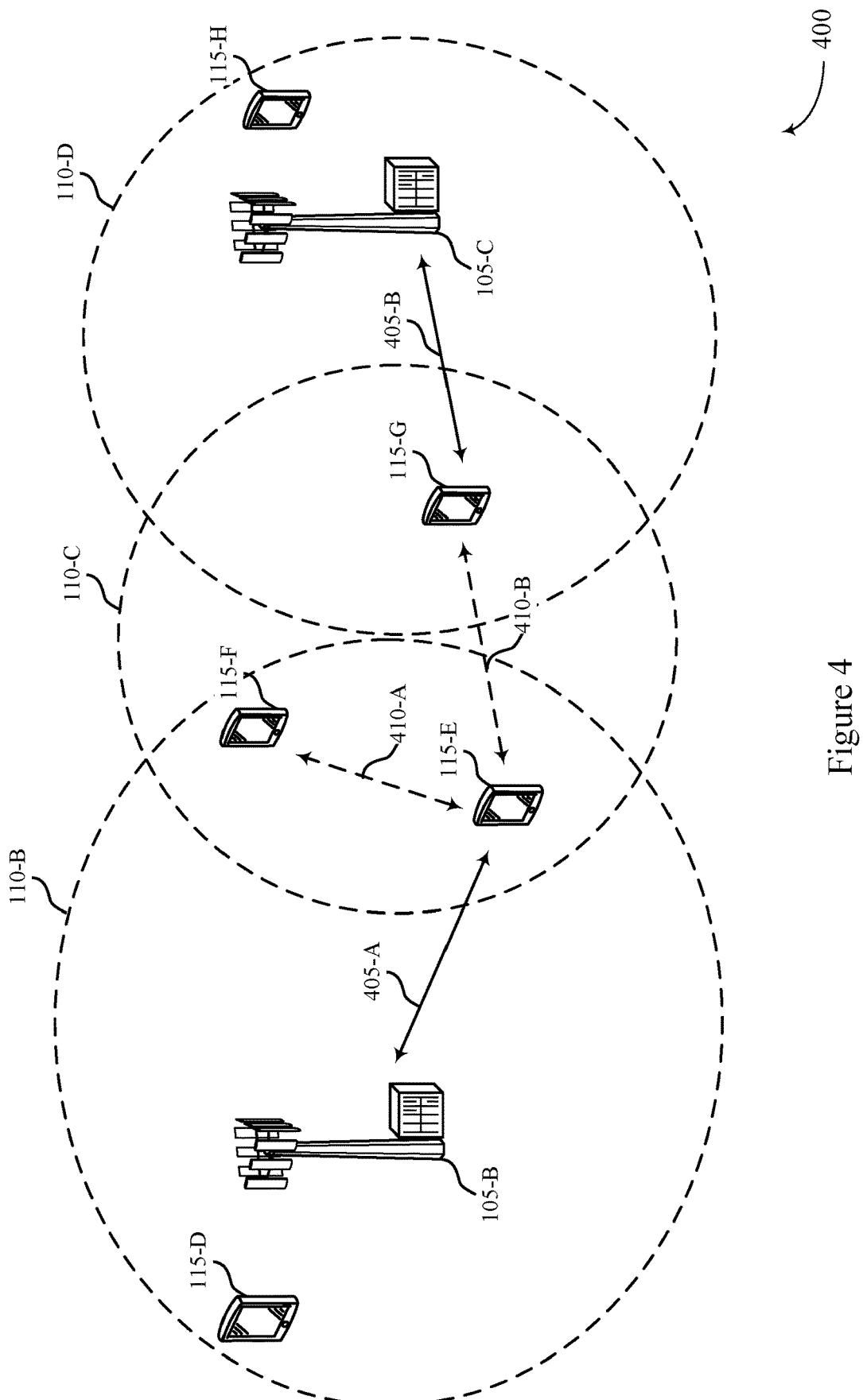
FIG. 4 shows an example wireless communications system that supports beamforming parameter adaptation techniques.

FIG. 4 illustrates an example wireless communications system 400 that supports beamforming parameter adaptation techniques. The wireless communications system 400 may support beamforming parameter adaptation techniques for wireless communications systems. In some examples, the wireless communications system 400 may implement aspects of the wireless communications system 100, the signaling diagram 200, or the frequency scheme 300. The base stations 105-b and 105-c each may be an example of one or more aspects of a base station 105 described herein, including with reference to FIGS. 1-3. The UEs 115-d, 115-e, 115-f, 115-g, and 115-h, each may be an example of one or more aspects of a UE 115 described herein, including with reference to FIGS. 1-3. It is to be understood that references to specific wireless devices (for example, UEs or base stations) in the below figures are provided for illustrative purposes, and different wireless devices not specifically referred to herein may be used interchangeably with those described herein (for example, the described techniques may be implemented by infra nodes, small cell nodes, integrated access and backhaul (IAB) nodes, repeaters (dumb as well as smart), relay/sidelink nodes, or any combination thereof, among other examples of wireless nodes). Likewise, the described operations performed by a UE may, in some implementations, be performed by a base station, and vice versa.

In some examples, the wireless communications system 400 may illustrate an example of a relatively dense mmW deployment providing relatively robust coverage in the geographic coverage areas 110-b, 110-c, and 110-d for the devices of the wireless communications system 400. For example, the wireless communications system may include one or more infra nodes (for example, small cell nodes, IAB nodes, relay/sidelink nodes, repeaters (dumb as well as smart), customer-premises equipment (CPE), among other examples). Although illustrated as base stations 105 and UEs 115, the devices of the wireless communications system 400 may additionally, or alternatively, represent or include such other infra nodes. In some implementations, a UE 115 may see multiple infra nodes as well as other UEs 115 in the network.

Accordingly, the techniques described herein with reference to at least FIG. 2 may be implemented by other devices, communications systems, communications links (for example, access links 405 between a base station 105 and a UE 115, sidelinks 410 between UEs 115, or other types of links between devices), or any combination thereof. For example, the wireless communications system 400 may illustrate an example of a UE 115-e in an access link 405-a with the base station 105-b (for example, an access link setting), a sidelink 410-a with the UE 115-f (for example, a sidelink setting), communications between infra nodes and other infra nodes or UEs 115, or any combination thereof. The wireless nodes may implement the beamforming parameter adaptation techniques as described herein with reference to FIG. 2. For example, a wireless node may coordinate with one or more other nodes in terms of feedback information as well as conveyance of analog parameter choices determined from the feedback information.

As an illustrative example, the UE 115-e may form a sidelink network with the UEs 115-f and the UE 115-g, an access link network with the base station 105-b (for example, a first transmission reception point (TRP)) and the base station 105-c (for example, a second TRP), or any combination thereof. The UE 115-e may determine the default operating frequencies of one or more nodes. For example, the base stations 105 may broadcast or otherwise indicate their respective default operating frequencies to the UE 115-e. Additionally, or alternatively, the UE 115-e may determine the default operating frequencies of the UEs 115-f and 115-g. For example, the UE 115-e may transmit a request for capability messages to the other UEs 115 using control signaling (for example, sidelink control signaling, RRC signaling, among other examples of control signaling). The UE 115-e may receive the capability messages in response to transmitting the request. The capability messages may indicate a default operating frequency of the nodes. For example, the UE 115-f may transmit a capability message indicating the default operating frequency of the UE 115-f. The UE 115-e may determine a system operating frequency as described herein with reference to FIG. 2. For example, the UE 115-e may determine an operating frequency associated with the default operating frequencies of the other nodes, associated with one or more signal measurement reports, associated with a majority scheme, associated with a priority scheme, or any combination thereof.

Figure 5:
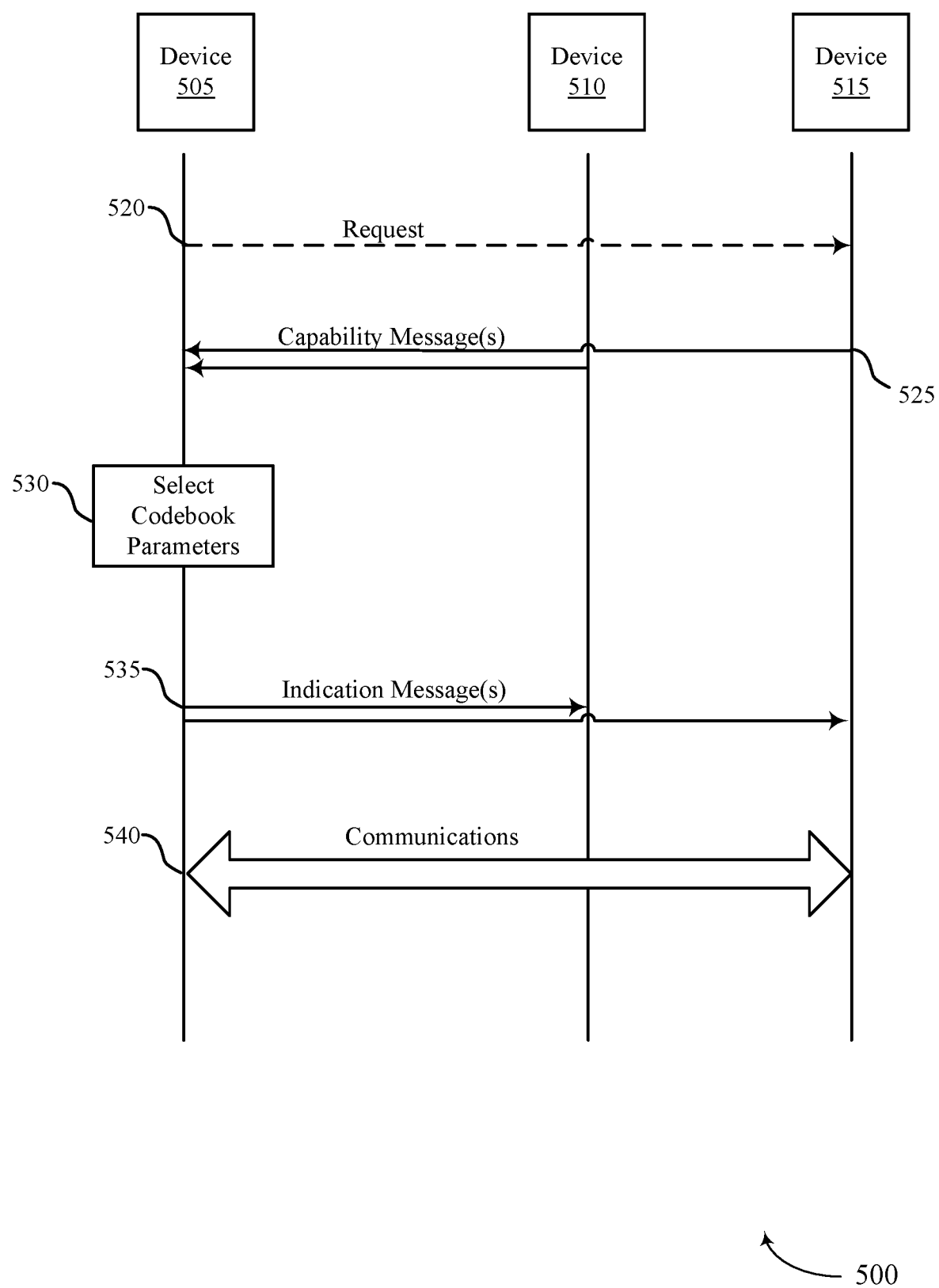
FIG. 5 shows an example process flow that supports beamforming parameter adaptation techniques.

FIG. 5 shows an example process flow 500 that supports beamforming parameter adaptation techniques. The process flow 500 may support beamforming parameter adaptation techniques for wireless communications systems. In some examples, the process flow 500 may implement aspects of wireless communications systems 100 or 400, the signaling diagram 200, or frequency scheme 300 as described with reference to FIGS. 1-4. For example, the process flow 500 may include wireless devices 505, 510, and 515, which may be examples of base stations 105, UEs 115, infra nodes, CPEs, IAB nodes, repeaters, sidelink nodes, or any combination thereof as described herein. The process flow 500 may illustrate an example of a serving wireless device 505 selecting codebook parameters associated with (such as based on or in response to) capability information from the wireless devices 510 and 515.

In the following description of the process flow 500, the operations between the wireless devices 505, 510, and 515 may be transmitted in a different order than the order shown, or the operations performed by wireless devices may be performed in different orders or at different times. Certain operations also may be left out of the process flow 500, or other operations may be added to the process flow 500.

In some examples, at 520 the wireless device 505 may transmit a request to one or both of the wireless devices 510 and 515. For example, the wireless device 505 may transmit a request for a capability message to the wireless device 510 or the wireless device 515. Additionally, or alternatively, the wireless device 505 may transmit a request for one or more reports as described herein (for example, signal measurement reports).

At 525, the wireless device 510, the wireless device 515, or both may send capability messages to the wireless device 505. For example, the wireless device 510 may transmit a capability message indicating a default operating frequency of the wireless device 510 and the wireless device 515 may transmit a capability message indicating a default operating frequency of the wireless device 515. In some examples, the wireless devices 510 and 515 may transmit the capability messages in response to the request received at 520. Additionally, or alternatively, the wireless devices 510 or 515 may transmit one or more reports as described herein. For example, the wireless device 510 may include one or more signal measurement reports in the capability message or may report the signal measurements separate from the capability message.

At 530, the wireless device 505 may select one or more codebook parameters associated with the received capability messages. For example, the wireless device 505 may determine an operating frequency as described herein with reference to FIG. 2 (for example, the wireless device 505 may select the default operating frequency associated with a priority scheme, a majority scheme, the capabilities of the wireless devices 510 and 515, the default operating frequencies of the wireless devices 510 and 515, or any combination thereof).

At 535, the wireless device 505 may send one or more indication messages to the wireless device 510 or the wireless device 515. For example, the wireless device 505 may indicate the selected one or more codebook parameters to the wireless device 510 and the wireless device 515. In some examples, the one or more codebook parameters may indicate the determined operating frequency for the system.

At 540, the wireless devices may communicate in response to the indication messages. For example, the wireless device 505 may adjust (for example, adapt) one or more codebook parameters to the selected codebook parameters (for example, the wireless device 505 may communicate at the determined operating frequency for the system). Additionally, or alternatively, the wireless devices 510 and 515 may adjust one or more parameters for the communications as described herein with reference to FIG. 2.

Figure 6:
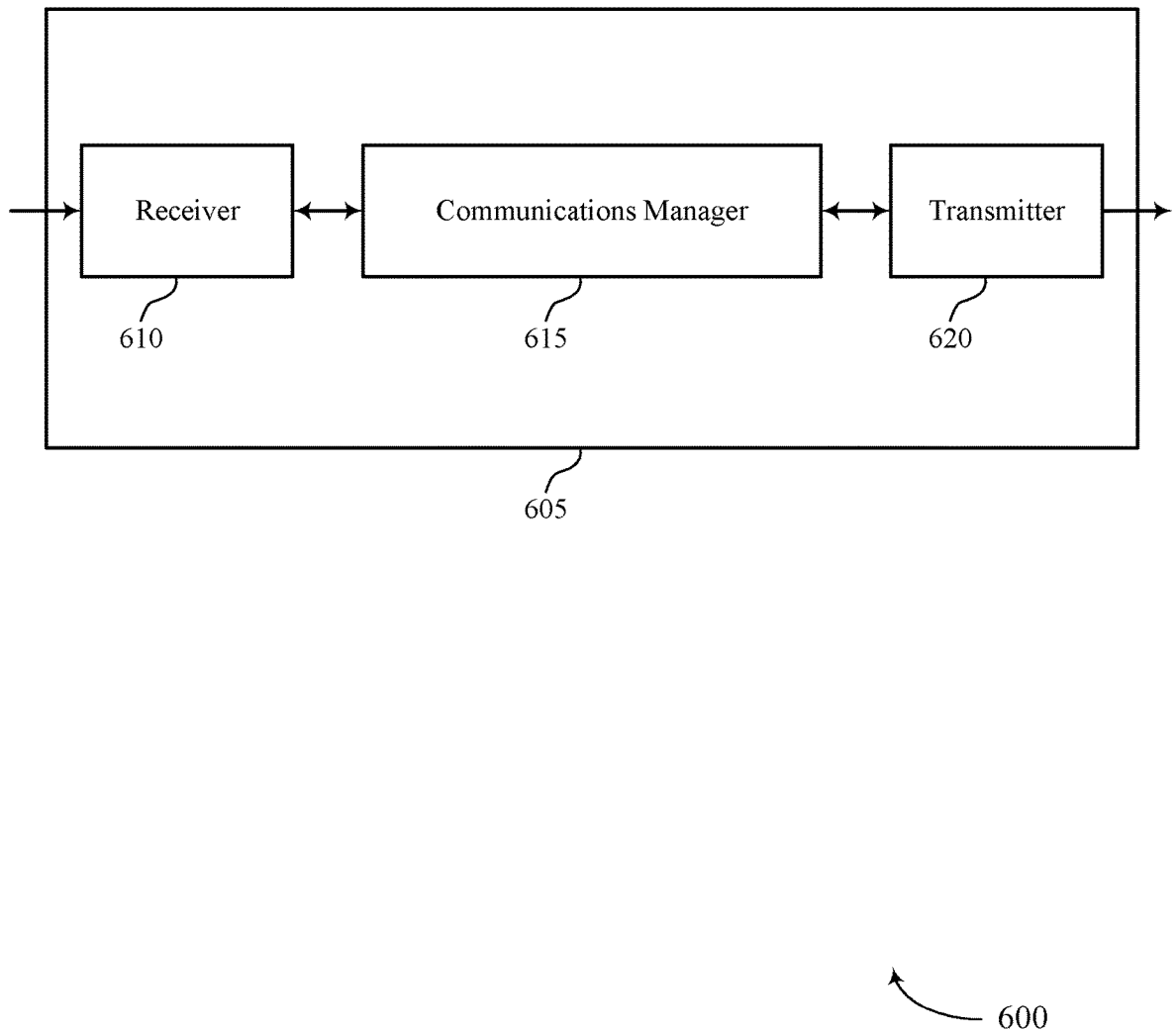
FIGS. 6 and 7 show block diagrams of example devices that support beamforming parameter adaptation techniques.

FIG. 6 shows a block diagram 600 of a wireless device 605 that supports beamforming parameter adaptation techniques. The wireless device 605 may be an example of aspects of a UE 115 or base station 105 as described herein. The wireless device 605 may include a receiver 610, a communications manager 615, and a transmitter 620. The wireless device 605 also may include a processor. Each of these components may be in communication with one another (such as via one or more buses).

Receiver 610 may receive information such as packets, user data, or control information associated with various information channels (such as control channels, data channels, and information related to beamforming parameter adaptation techniques for wireless communications systems, etc.). Information may be passed on to other components of the wireless device 605. The receiver 610 may be an example of aspects of the transceiver 920 or 1020 as described with reference to FIGS. 9 and 10. The receiver 610 may utilize a single antenna or a set of antennas.

In some examples, the wireless device 605 may be an example of a wireless device selecting and indicating one or more codebook parameters. In such examples, the communications manager 615 may receive a capability message from at least another wireless device in a wireless communications system, the capability message indicating a default operating frequency of the other wireless device, a default operating frequency priority of the other wireless device, or both, select one or more codebook parameters associated with the capability message, the one or more codebook parameters indicating a default operating frequency for the wireless communications system, transmit, to at least the other wireless device, an indication of the one or more codebook parameters, and communicate with at least the other wireless device in accordance with the one or more codebook parameters.

In some examples, the wireless device 605 may be an example of a wireless device receiving an indication of one or more codebook parameters. In such examples, the communications manager 615 also may transmit a capability message to a another wireless device in a wireless communications system, the capability message indicating a default operating frequency of the wireless device, a default operating frequency priority of the wireless device, or both, receive, from the other wireless device, an indication of one or more codebook parameters associated with transmitting the capability message, the one or more codebook parameters indicating a default operating frequency for the wireless communications system, and communicate with the other wireless device in accordance with the one or more codebook parameters. The communications manager 615 may be an example of aspects of the communications manager 910 or 1010 as described herein.

In some implementations, the communications manager 615, when functioning as a processor or a processing system, may obtain signaling from the receiver 610, using a first interface and may output signaling for transmission via the transmitter 620 using the first interface or a second interface.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
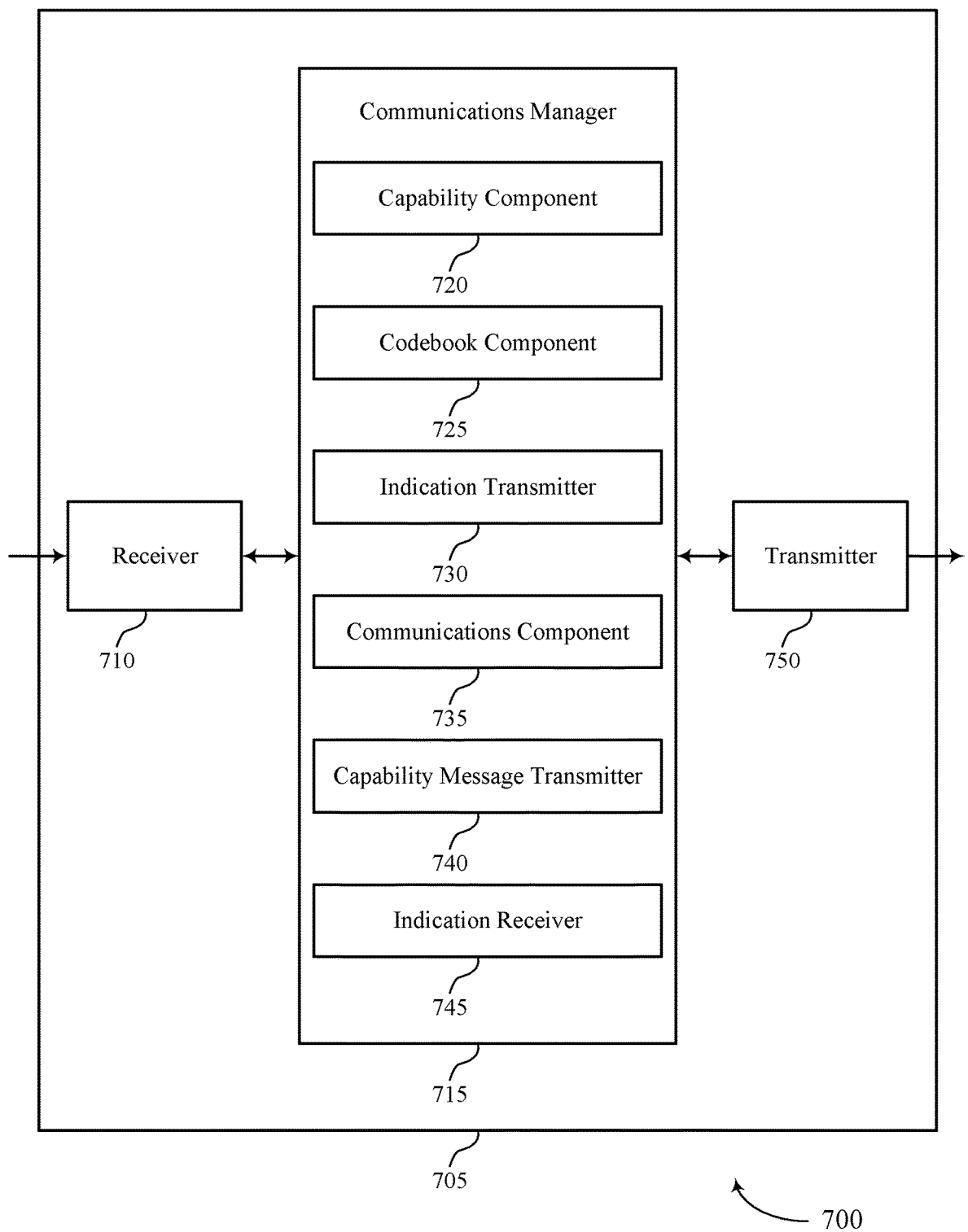

FIG. 7 shows a block diagram 700 of a wireless device 705 that supports beamforming parameter adaptation techniques. The wireless device 705 may be an example of aspects of a wireless device 605, a UE 115, or a base station 105 as described herein. The wireless device 705 may include a receiver 710, a communications manager 715, and a transmitter 750. The wireless device 705 also may include a processor. Each of these components may be in communication with one another (such as via one or more buses).

Receiver 710 may receive information such as packets, user data, or control information associated with various information channels (such as control channels, data channels, and information related to beamforming parameter adaptation techniques for wireless communications systems, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a capability component 720, a codebook component 725, an indication transmitter 730, a communications component 735, a capability message transmitter 740, and an indication receiver 745. The communications manager 715 may be an example of aspects of the communications manager 910 or 1010 as described herein.

In some examples, the wireless device 705 may be an example of a wireless device selecting and indicating one or more codebook parameters. In such examples, the capability component 720 may receive, at the wireless device, a capability message from at least another wireless device in a wireless communications system, the capability message indicating a default operating frequency of the other wireless device, a default operating frequency priority of the other wireless device, or both.

The codebook component 725 may select one or more codebook parameters associated with the capability message, the one or more codebook parameters indicating a default operating frequency for the wireless communications system.

The indication transmitter 730 may transmit, to at least the other wireless device, an indication of the one or more codebook parameters.

The communications component 735 may communicate with at least the other wireless device in accordance with the one or more codebook parameters.

In some examples, the wireless device 705 may be an example of a wireless device receiving an indication of one or more codebook parameters. In such examples, the capability message transmitter 740 may transmit a capability message to another wireless device in a wireless communications system, the capability message indicating a default operating frequency of the wireless device, a default operating frequency priority of the wireless device, or both.

The indication receiver 745 may receive, from the other wireless device, an indication of one or more codebook parameters associated with transmitting the capability message, the one or more codebook parameters indicating a default operating frequency for the wireless communications system.

The communications component 735 may communicate with the other wireless device in accordance with the one or more codebook parameters.

Transmitter 750 may transmit signals generated by other components of the device 705. In some examples, the transmitter 750 may be collocated with a receiver 710 in a transceiver module. For example, the transmitter 750 may be an example of aspects of the transceiver 920 or 1020 as described with reference to FIGS. 9 and 10. The transmitter 750 may utilize a single antenna or a set of antennas.

Figure 8:
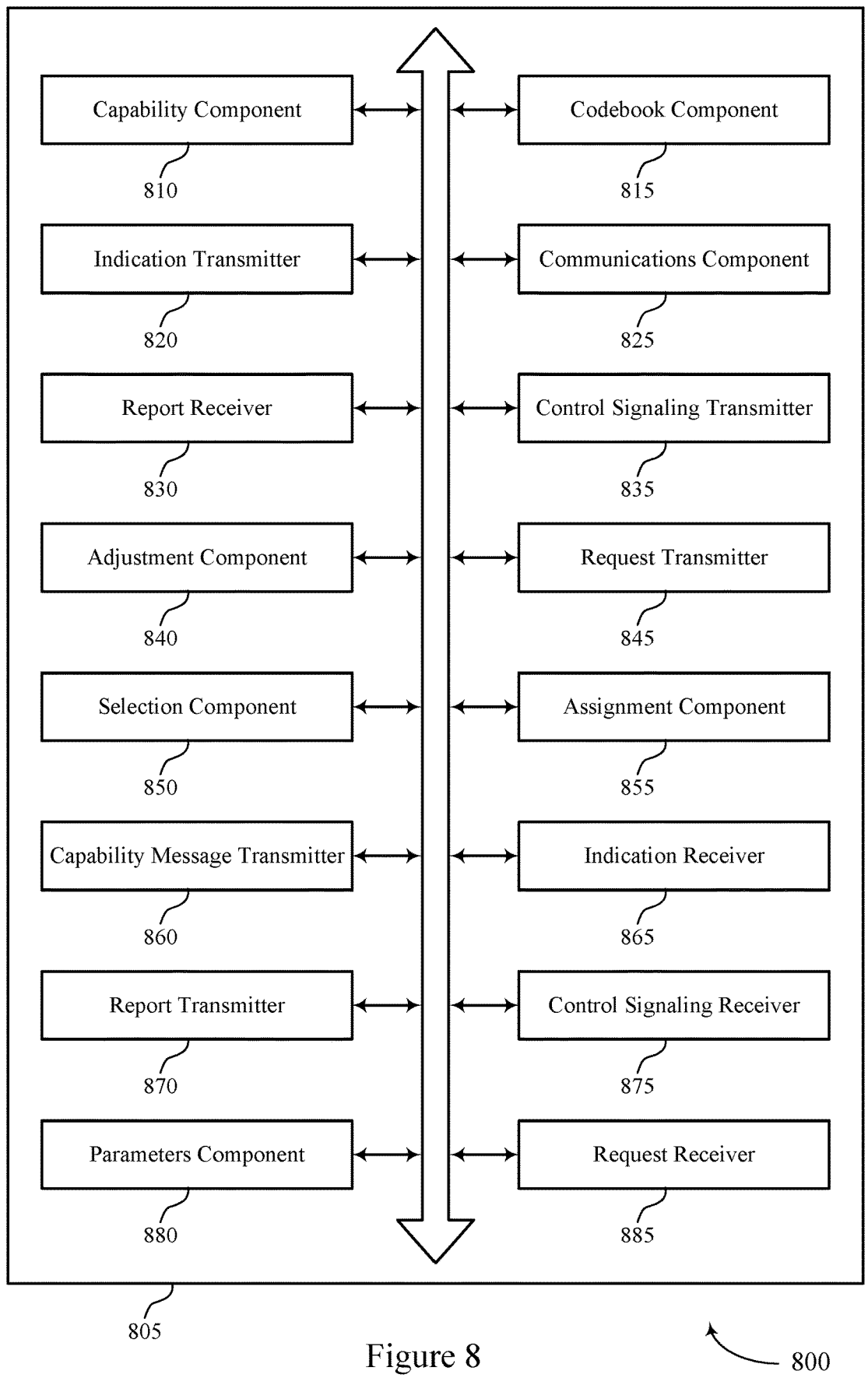
FIG. 8 shows a block diagram of an example communications manager that supports beamforming parameter adaptation techniques.

FIG. 8 shows a block diagram 800 of a communications manager 805 that supports beamforming parameter adaptation techniques. The communications manager 805 may be an example of aspects of a communications manager 615, a communications manager 715, or a communications manager 910 described herein. The communications manager 805 may include a capability component 810, a codebook component 815, an indication transmitter 820, a communications component 825, a report receiver 830, a control signaling transmitter 835, an adjustment component 840, a request transmitter 845, a selection component 850, an assignment component 855, a capability message transmitter 860, an indication receiver 865, a report transmitter 870, a control signaling receiver 875, a parameters component 880, and a request receiver 885. Each of these modules may communicate, directly or indirectly, with one another (such as via one or more buses).

In some examples, the communications manager 805 may be implemented by a wireless device selecting and transmitting an indication of one or more codebook parameters. In such examples, the capability component 810 may receive a capability message from at least another wireless device in a wireless communications system, the capability message indicating a default operating frequency of the other wireless device, a default operating frequency priority of the other wireless device, or both. In some examples, the capability component 810 may receive a set of capability messages from a set of wireless devices, the set of capability messages including the capability message from the other wireless device. The codebook component 815 may select one or more codebook parameters associated with the capability message, the one or more codebook parameters indicating a default operating frequency for the wireless communications system.

The indication transmitter 820 may transmit, to at least the other wireless device, an indication of the one or more codebook parameters.

The communications component 825 may communicate with at least the other wireless device in accordance with the one or more codebook parameters. In some examples, the communications component 825 may communicate using the default operating frequency for the wireless communications system.

The report receiver 830 may receive one or more reports from at least the other wireless device, the one or more reports indicating a signal to noise ratio for one or more frequencies. In some implementations, the capability message includes the one or more reports from at least the other wireless device.

The control signaling transmitter 835 may transmit control signaling to at least the other wireless device, the control signaling configuring the one or more frequencies associated with the one or more reports.

The adjustment component 840 may adjust a first default operating frequency of the wireless device to the default operating frequency for the wireless communications system based on the one or more codebook parameters. In some examples, the adjustment component 840 may adjust a first default operating frequency of the wireless device to the default operating frequency for the wireless communications system based on receiving the indication.

The request transmitter 845 may transmit a request for the capability message to at least the other wireless device, where receiving the capability message is associated with transmitting the request.

The selection component 850 may select the default operating frequency for the wireless communications system based on a majority of the set of capability messages indicating the default operating frequency for the wireless communications system. In some examples, selecting the default operating frequency for the wireless communications system may be based on a set of default operating frequency priorities including a respective operating frequency priority associated with each wireless device of the set of wireless devices, where the set of default operating frequency priorities includes the default operating frequency priority of the other wireless device. In some examples, selecting the default operating frequency for the wireless communications system may be based on a set of default operating frequencies including a respective default operating frequency associated with each wireless device of the set of wireless devices, where the set of default operating frequencies includes the default operating frequency of the other wireless device.

The assignment component 855 may assign the default operating frequency priority of the other wireless device to at least the other wireless device. In some implementations, the default operating frequency priority of the other wireless device corresponds to a capability of the other wireless device.

In some examples, the communications manager 805 may be implemented by a wireless device receiving an indication of one or more codebook parameters. In such examples, the report transmitter 870 may transmit one or more reports to the first wireless device, the one or more reports indicating a signal to noise ratio for one or more frequencies.

The capability message transmitter 860 may transmit a capability message to another wireless device in a wireless communications system, the capability message indicating a default operating frequency of the wireless device, a default operating frequency priority of the wireless device, or both.

The indication receiver 865 may receive, from another wireless device, an indication of one or more codebook parameters based on transmitting the capability message, the one or more codebook parameters indicating a default operating frequency for the wireless communications system.

The control signaling receiver 875 may receive control signaling from at least the other wireless device, the control signaling configuring the one or more frequencies associated with the one or more reports.

The parameters component 880 may determine the one or more codebook parameters based on receiving the indication.

The request receiver 885 may receive a request for the capability message from the other wireless device, where transmitting the capability message is based on the request for the capability message.

Figure 9:
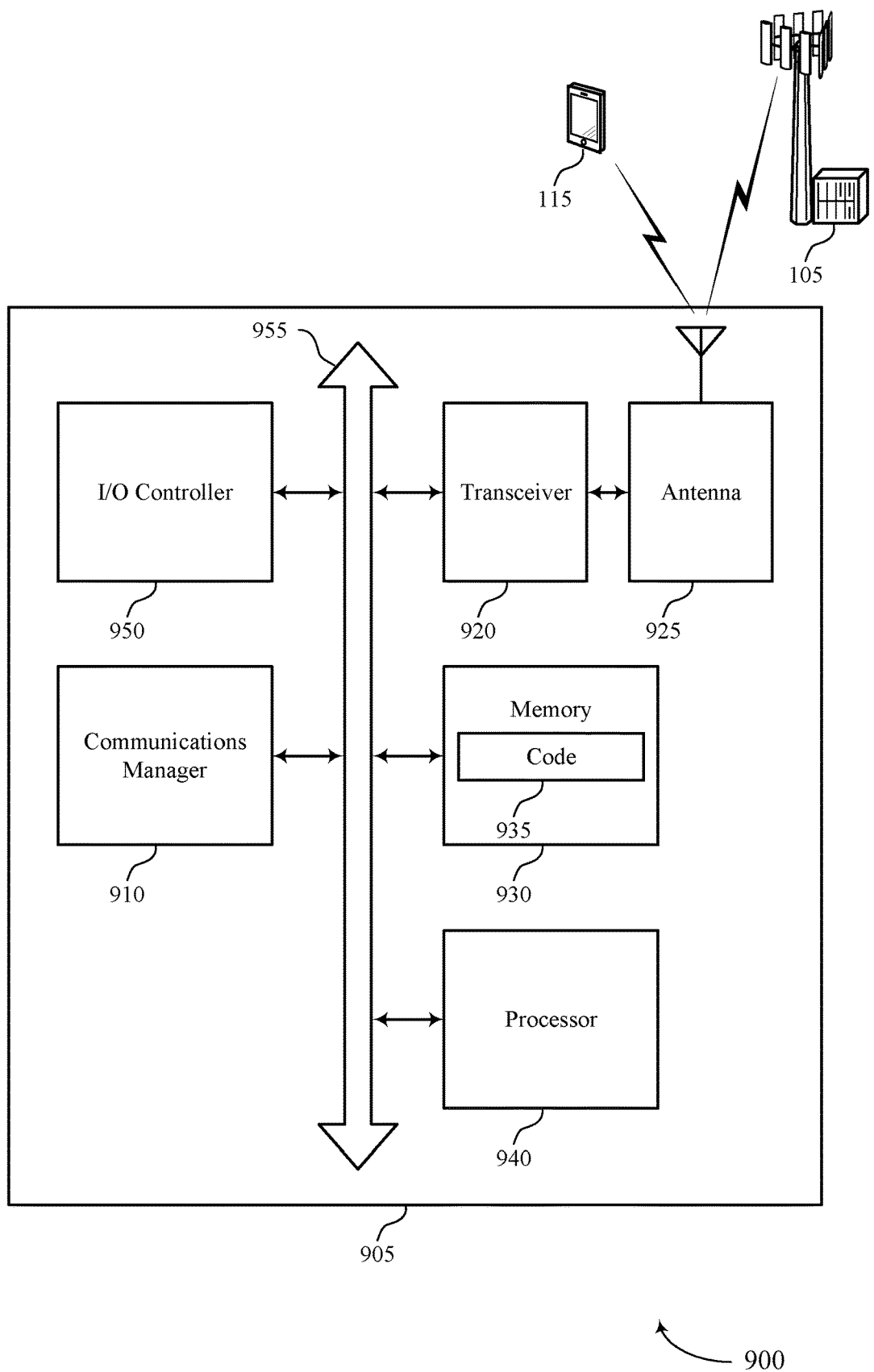
FIG. 9 shows a diagram of an example system including a user equipment (UE) that supports beamforming parameter adaptation techniques.

FIG. 9 shows a diagram of a system 900 including a wireless device 905 that supports beamforming parameter adaptation techniques. The wireless device 905 may be an example of or include the components of the wireless device 605, the wireless device 705, or a UE 115 as described herein. The wireless device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (such as bus 955).

In some implementations (for example, when the wireless device 905 selects and indicates one or more codebook parameters), the communications manager 910 may receive a capability message from at least another wireless device in a wireless communications system, the capability message indicating a default operating frequency of the other wireless device, a default operating frequency priority of the other wireless device, or both, select one or more codebook parameters associated with the capability message, the one or more codebook parameters indicating a default operating frequency for the wireless communications system, transmit, to at least the other wireless device, an indication of the one or more codebook parameters, and communicate with at least the other wireless device in accordance with the one or more codebook parameters.

In some implementations (for example, when the wireless device 905 receives an indication of one or more codebook parameters), the communications manager 910 may additionally, or alternatively, transmit a capability message to another wireless device in a wireless communications system, the capability message indicating a default operating frequency of the wireless device, a default operating frequency priority of the wireless device, or both, receive, from the other wireless device, an indication of one or more codebook parameters, for example, associated with or in response to transmitting the capability message, the one or more codebook parameters indicating a default operating frequency for the wireless communications system, and communicate with the other wireless device in accordance with the one or more codebook parameters.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 also may include a modem to modulate the packets and provide the modulated packets to the antennas for transmission, and to demodulate packets received from the antennas.

In some implementations, the wireless device may include a single antenna 925. However, in some implementations the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (such as the processor 940) cause the device to perform various functions described herein. In some implementations, the memory 930 may contain, among other things, a basic input/output system (BIOS) which may control basic hardware or software operation such as the interaction with peripheral components or devices.

The I/O controller 950 may manage input and output signals for the device 905. The I/O controller 950 also may manage peripherals not integrated into the device 905. In some implementations, the I/O controller 950 may represent a physical connection or port to an external peripheral. In some implementations, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some implementations, the I/O controller 950 may be implemented as part of a processor. In some implementations, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some implementations, the code 935 may not be directly executable by the processor 940 but may cause a computer (such as when compiled and executed) to perform functions described herein.

Figure 10:
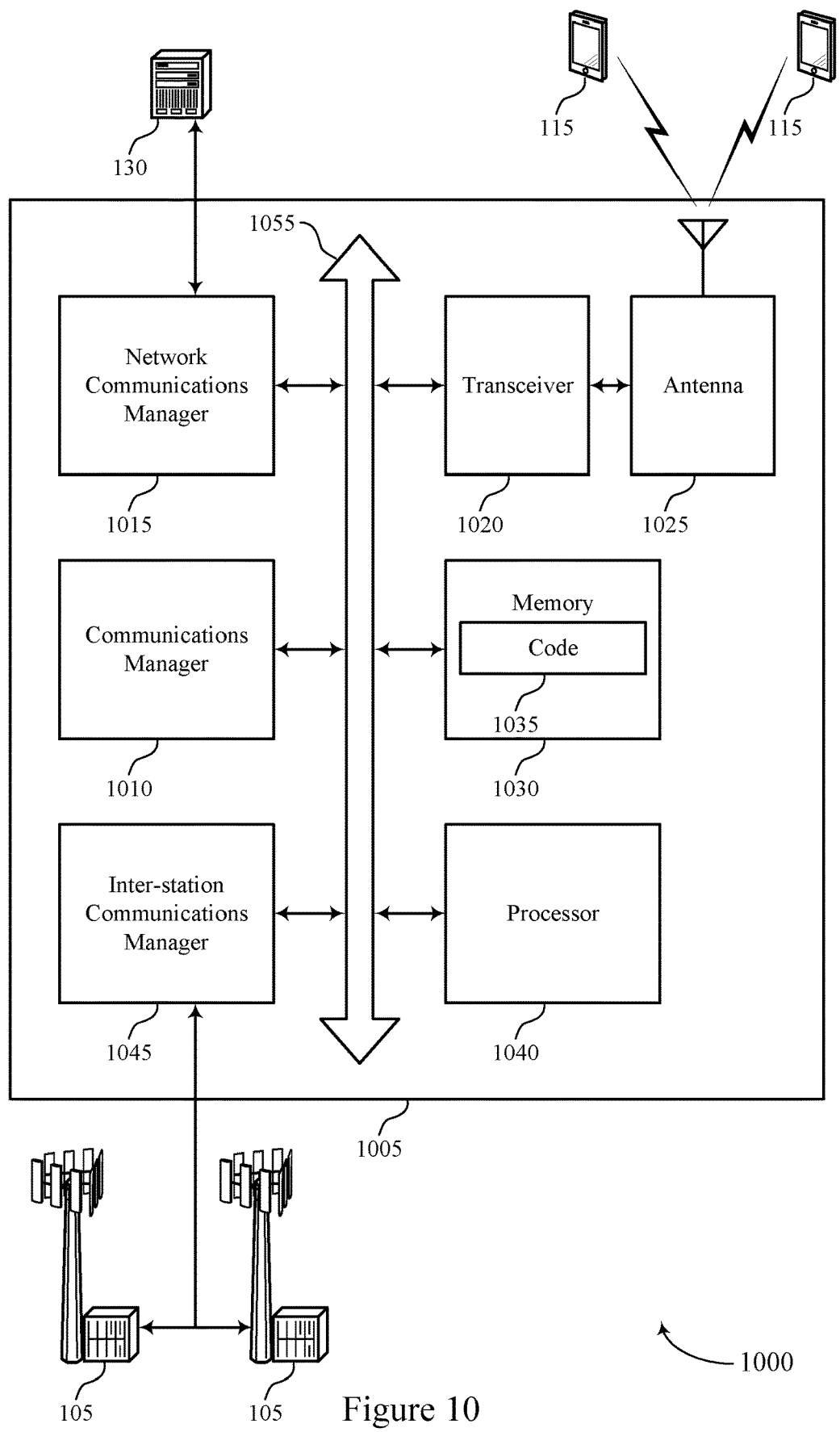
FIG. 10 shows a diagram of an example system including a base station (BS) that supports beamforming parameter adaptation techniques.

FIG. 10 shows a diagram of a system 1000 including a wireless device 1005 that supports beamforming parameter adaptation techniques. The wireless device 1005 may be an example of or include the components of the wireless device 605, the wireless device 705, or a base station 105 as described herein. The wireless device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (such as bus 1055).

In some implementations, the wireless device 1005 may be an example of a wireless device selecting and indicating one or more codebook parameters. In such implementations, the communications manager 1010 may receive a capability message from at least another wireless device in a wireless communications system, the capability message indicating a default operating frequency of the other wireless device, a default operating frequency priority of the other wireless device, or both, select one or more codebook parameters associated with the capability message, the one or more codebook parameters indicating a default operating frequency for the wireless communications system, transmit, to at least the other wireless device, an indication of the one or more codebook parameters, and communicate with at least the other wireless device in accordance with the one or more codebook parameters.

In some implementations, the wireless device 1005 may be an example of a wireless device receiving an indication of one or more codebook parameters. In such implementations, the communications manager 1010 may additionally, or alternatively, transmit a capability message to another wireless device in a wireless communications system, the capability message indicating a default operating frequency of the wireless device, a default operating frequency priority of the wireless device, or both, receive, from the other wireless device, an indication of one or more codebook parameters associated with transmitting the capability message, the one or more codebook parameters indicating a default operating frequency for the wireless communications system, and communicate with the other wireless device in accordance with the one or more codebook parameters.

Network communications manager 1015 may manage communications with the core network (such as via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 also may include a modem to modulate the packets and provide the modulated packets to the antennas for transmission, and to demodulate packets received from the antennas.

In some implementations, the wireless device may include a single antenna 1025. However, in some implementations the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (such as the processor 1040) cause the device to perform various functions described herein. In some implementations, the memory 1030 may contain, among other things, a BIOS which may control basic hardware or software operation such as the interaction with peripheral components or devices.

Inter-station communications manager 1045 may manage communications with other base stations 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some implementations, the code 1035 may not be directly executable by the processor 1040 but may cause a computer (such as when compiled and executed) to perform functions described herein.

Figure 11:
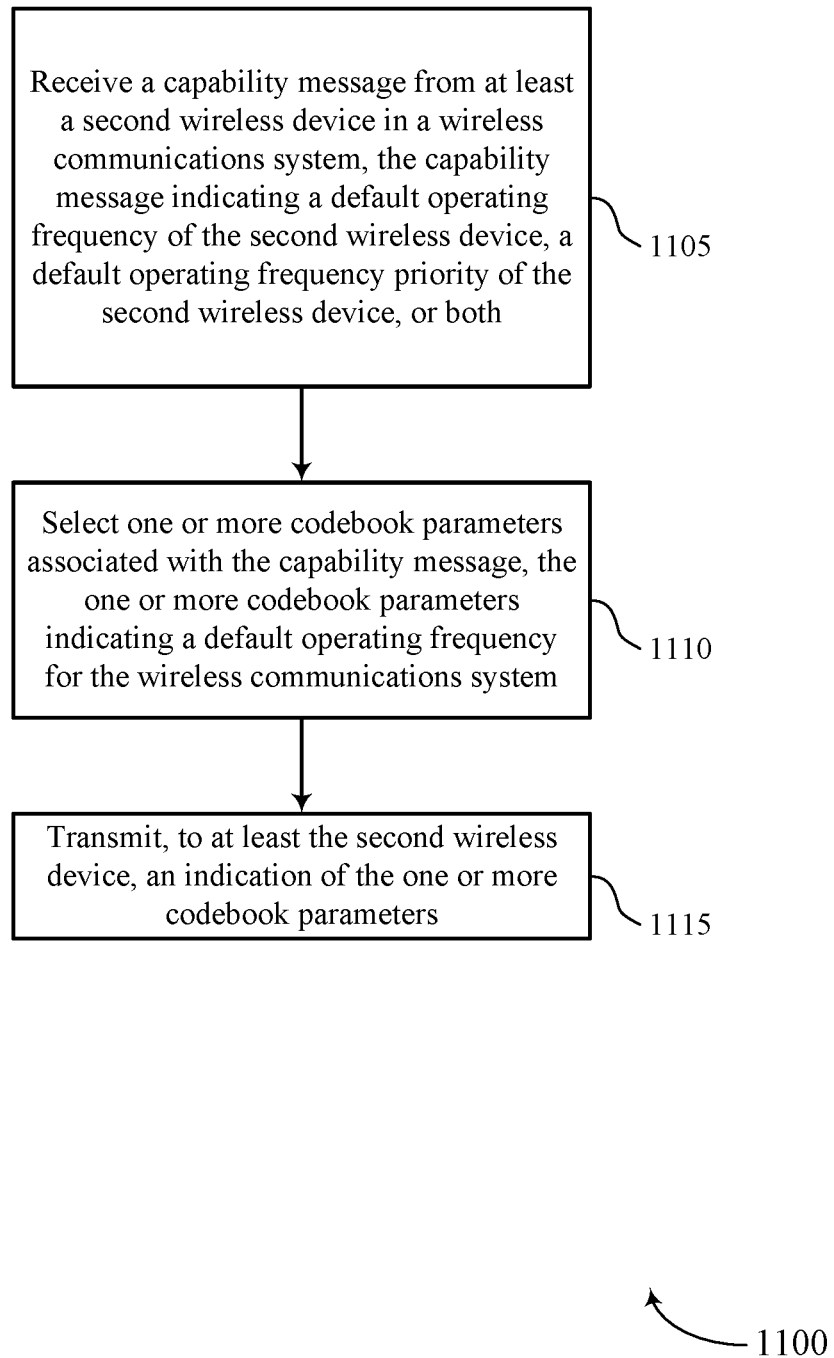
FIGS. 11-13 show example flowcharts for operating one or more devices that support beamforming parameter adaptation techniques.

FIG. 11 shows a flowchart illustrating a method 1100 that supports beamforming parameter adaptation techniques. The operations of method 1100 may be implemented by a UE 115 or base station 105 or its components as described herein. For example, the operations of method 1100 may be performed by a communications manager as described with reference to FIGS. 6-10. In some examples, a UE or base station may execute a set of instructions to control the functional elements of the UE or base station to perform the functions described herein. Additionally, or alternatively, a UE or base station may perform aspects of the functions described herein using special-purpose hardware.

At 1105, the UE or base station may receive a capability message from at least a second wireless device in a wireless communications system, the capability message indicating a default operating frequency of the second wireless device, a default operating frequency priority of the second wireless device, or both. The operations of 1105 may be performed according to the methods described herein. In some examples, aspects of the operations of 1105 may be performed by a capability component as described with reference to FIGS. 6-10.

At 1110, the UE or base station may select one or more codebook parameters associated with the capability message, the one or more codebook parameters indicating a default operating frequency for the wireless communications system. The operations of 1110 may be performed according to the methods described herein. In some examples, aspects of the operations of 1110 may be performed by a codebook component as described with reference to FIGS. 6-10.

At 1115, the UE or base station may transmit, to at least the second wireless device, an indication of the one or more codebook parameters. The operations of 1115 may be performed according to the methods described herein. In some examples, aspects of the operations of 1115 may be performed by an indication transmitter as described with reference to FIGS. 6-10.

Figure 12:
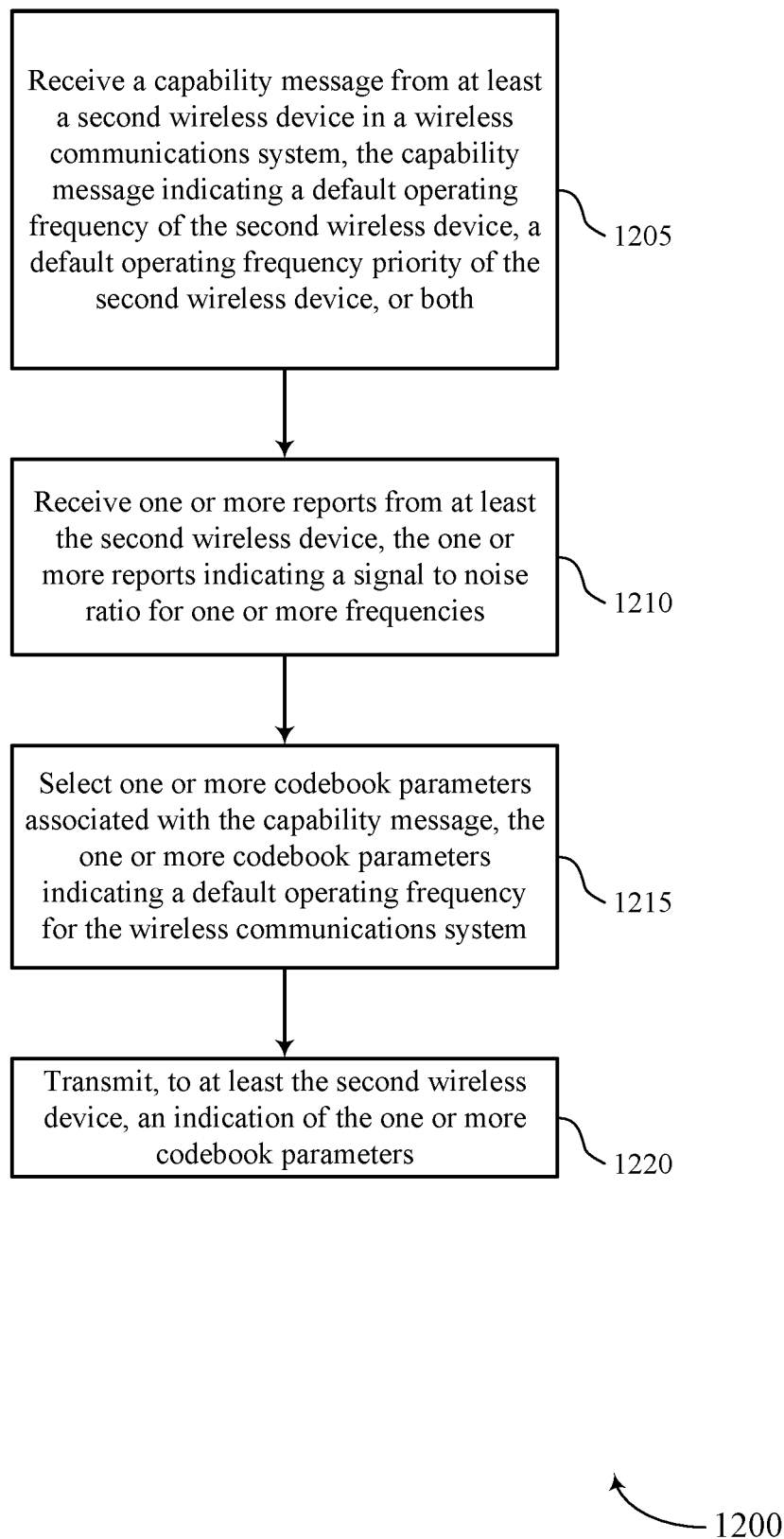

FIG. 12 shows a flowchart illustrating a method 1200 that supports beamforming parameter adaptation techniques. The operations of method 1200 may be implemented by a UE 115 or base station 105 or its components as described herein. For example, the operations of method 1200 may be performed by a communications manager as described with reference to FIGS. 6-10. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may receive a capability message from at least a second wireless device in a wireless communications system, the capability message indicating a default operating frequency of the second wireless device, a default operating frequency priority of the second wireless device, or both. The operations of 1205 may be performed according to the methods described herein. In some examples, aspects of the operations of 1205 may be performed by a capability component as described with reference to FIGS. 6-10.

At 1210, the UE or base station may receive one or more reports from at least the second wireless device, the one or more reports indicating a signal to noise ratio for one or more frequencies. The operations of 1210 may be performed according to the methods described herein. In some examples, aspects of the operations of 1210 may be performed by a report receiver as described with reference to FIGS. 6-10.

At 1215, the UE or base station may select one or more codebook parameters associated with the capability message, the one or more codebook parameters indicating a default operating frequency for the wireless communications system. The operations of 1215 may be performed according to the methods described herein. In some examples, aspects of the operations of 1215 may be performed by a codebook component as described with reference to FIGS. 6-10.

At 1220, the UE or base station may transmit, to at least the second wireless device, an indication of the one or more codebook parameters. The operations of 1220 may be performed according to the methods described herein. In some examples, aspects of the operations of 1220 may be performed by an indication transmitter as described with reference to FIGS. 6-10.

Figure 13:
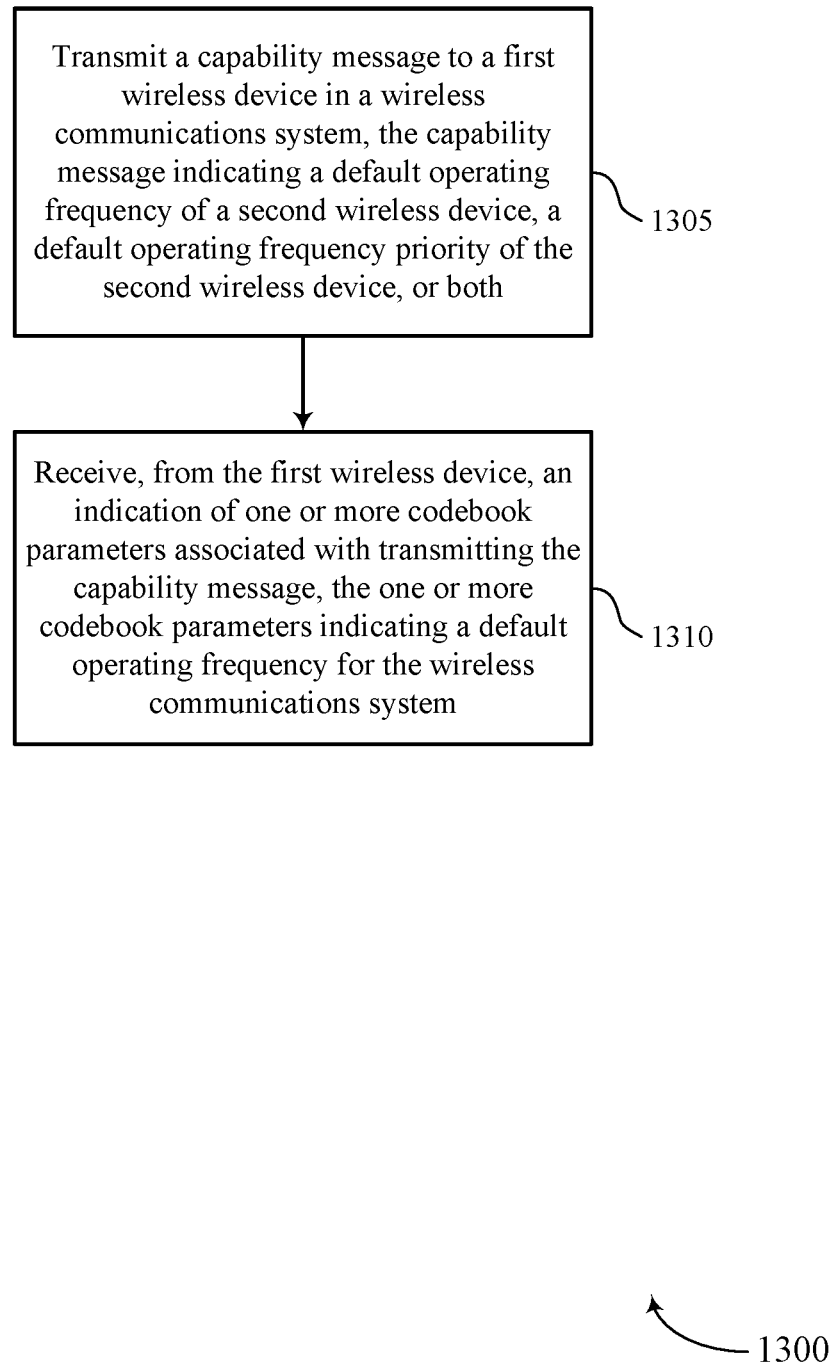

FIG. 13 shows a flowchart illustrating a method 1300 that supports beamforming parameter adaptation techniques. The operations of method 1300 may be implemented by a UE 115 or base station 105 or its components as described herein. For example, the operations of method 1300 may be performed by a communications manager as described with reference to FIGS. 6-10. In some examples, a UE or base station may execute a set of instructions to control the functional elements of the UE or base station to perform the functions described herein. Additionally, or alternatively, a UE or base station may perform aspects of the functions described herein using special-purpose hardware.

At 1305, the UE or base station may transmit a capability message to a first wireless device in a wireless communications system, the capability message indicating a default operating frequency of a second wireless device (for example, the UE or the base station), a default operating frequency, a default operating frequency priority of the second wireless device, or both. The operations of 1305 may be performed according to the methods described herein. In some examples, aspects of the operations of 1305 may be performed by a capability message transmitter as described with reference to FIGS. 6-10.

At 1310, the UE or base station may receive, from the first wireless device, an indication of one or more codebook parameters associated with transmitting the capability message, the one or more codebook parameters indicating a default operating frequency for the wireless communications system. The operations of 1310 may be performed according to the methods described herein. In some examples, aspects of the operations of 1310 may be performed by an indication receiver as described with reference to FIGS. 6-10.

The following provides an overview of aspects of the present disclosure:

Aspect 1: An apparatus for wireless communications at a first wireless device, including: a first interface configured to: obtain a capability message from at least a second wireless device in a wireless communications system, the capability message indicating a default operating frequency of the second wireless device, a default operating frequency priority of the second wireless device, or both; a processing system configured to: select one or more codebook parameters associated with the capability message, the one or more codebook parameters indicating a default operating frequency for the wireless communications system; and where the first interface or a second interface is configured to: output, to at least the second wireless device, an indication of the one or more codebook parameters.

Aspect 2: The apparatus of aspect 1, where the first interface or the second interface is further configured to: obtain one or more reports from at least the second wireless device, the one or more reports indicating a signal to noise ratio for one or more frequencies.

Aspect 3: The apparatus of aspect 2, where the capability message includes the one or more reports from at least the second wireless device.

Aspect 4: The apparatus of any of aspects 2-3, where the first interface or the second interface is further configured to: output control signaling to at least the second wireless device, the control signaling configuring the one or more frequencies associated with the one or more reports.

Aspect 5: The apparatus of any of aspects 1-4, where the first interface or the second interface is further configured to: communicate with at least the second wireless device in accordance with the one or more codebook parameters, and communicate using the default operating frequency for the wireless communications system.

Aspect 6: The apparatus of any of aspects 1-5, where the processing system is further configured to: adjust a first default operating frequency of the first wireless device to the default operating frequency for the wireless communications system based on the one or more codebook parameters.

Aspect 7: The apparatus of any of aspects 1-6, where the first interface or the second interface is further configured to: output a request for the capability message to at least the second wireless device, where obtaining the capability message is based on outputting the request.

Aspect 8: The apparatus of any of aspects 1-7, where the first interface or the second interface is further configured to: obtain a set of multiple capability messages from a set of multiple wireless devices, the set of multiple capability messages including the capability message from the second wireless device.

Aspect 9: The apparatus of aspect 8, where the processing system is further configured to: select the default operating frequency for the wireless communications system based on a majority of the set of multiple capability messages indicating the default operating frequency for the wireless communications system.

Aspect 10: The apparatus of any of aspects 8-9, where the processing system is further configured to: select the default operating frequency for the wireless communications system based on a set of default operating frequency priorities including a respective default operating frequency priority associated with each wireless device of the set of multiple wireless devices, where the set of default operating frequency priorities includes the default operating frequency priority of the second wireless device.

Aspect 11: The apparatus of any of aspects 8-10, where the processing system is further configured to: select the default operating frequency for the wireless communications system based on a set of default operating frequencies including a respective default operating frequency associated with each wireless device of the set of multiple wireless devices, where the set of default operating frequencies includes the default operating frequency of the second wireless device.

Aspect 12: The apparatus of any of aspects 1-11, where the processing system is further configured to: assign the default operating frequency priority of the second wireless device to at least the second wireless device.

Aspect 13: The apparatus of aspect 12, where the default operating frequency priority of the second wireless device corresponds to a capability of the second wireless device.

Aspect 14: An apparatus for wireless communications at a second wireless device, including: a processing system, a first interface, and a second interface, the second interface configured to: output a capability message to a first wireless device in a wireless communications system, the capability message indicating a default operating frequency of the second wireless device, a default operating frequency priority of the second wireless device, or both; and the first interface configured to: obtain, from the first wireless device, an indication of one or more codebook parameters associated with outputting the capability message, the one or more codebook parameters indicating a default operating frequency for the wireless communications system.

Aspect 15: The apparatus of aspect 14, where the second interface is further configured to: output one or more reports to the first wireless device, the one or more reports indicating a signal to noise ratio for one or more frequencies.

Aspect 16: The apparatus of aspect 15, where the first interface is further configured to: obtain control signaling to at least the second wireless device, the control signaling configuring the one or more frequencies associated with the one or more reports.

Aspect 17: The apparatus of any of aspects 14-16, where the processing system is further configured to: determine the one or more codebook parameters based on receiving the indication.

Aspect 18: The apparatus of any of aspects 14-17, where the processing system is further configured to: adjust a first default operating frequency of the second wireless device to the default operating frequency for the wireless communications system based on obtaining the indication.

Aspect 19: The apparatus of any of aspects 14-18, where a second interface is further configured to: communicate with the first wireless device in accordance with the one or more codebook parameters, and communicate using the default operating frequency for the wireless communications system.

Aspect 20: The apparatus of any of aspects 14-19, where the first interface is further configured to: obtain a request for the capability message from the first wireless device, where outputting the capability message is based on the request for the capability message.

Aspect 21: A method for wireless communications, including: receiving, at a first wireless device, a capability message from at least a second wireless device in a wireless communications system, the capability message indicating a default operating frequency of the second wireless device, a default operating frequency priority of the second wireless device, or both; and selecting one or more codebook parameters associated with the capability message, the one or more codebook parameters indicating a default operating frequency for the wireless communications system; transmitting, to at least the second wireless device, an indication of the one or more codebook parameters.

Aspect 22: The method of aspect 21, further including: receiving one or more reports from at least the second wireless device, the one or more reports indicating a signal to noise ratio for one or more frequencies.

Aspect 23: The method of aspect 22, where the capability message includes the one or more reports from at least the second wireless device.

Aspect 24: The method of any of aspects 22-23, further including: transmitting control signaling to at least the second wireless device, the control signaling configuring the one or more frequencies associated with the one or more reports.

Aspect 25: The method of any of aspects 21-24, further including: communicating with at least the second wireless device in accordance with the one or more codebook parameters, where the communicating further includes: communicating using the default operating frequency for the wireless communications system.

Aspect 26: The method of any of aspects 21-25, further including: adjusting a first default operating frequency of the first wireless device to the default operating frequency for the wireless communications system based on the one or more codebook parameters.

Aspect 27: The method of any of aspects 21-26, further including: transmitting a request for the capability message to at least the second wireless device, where receiving the capability message is based on transmitting the request.

Aspect 28: The method of any of aspects 21-27, further including: receiving a set of multiple capability messages from a set of multiple wireless devices, the set of multiple capability messages including the capability message from the second wireless device.

Aspect 29: The method of aspect 28, further including: selecting the default operating frequency for the wireless communications system based on a majority of the set of multiple capability messages indicating the default operating frequency for the wireless communications system.

Aspect 30: The method of any of aspects 28-29, further including: selecting the default operating frequency for the wireless communications system based on a set of default operating frequency priorities including a respective operating frequency priority associated with each wireless device of the set of multiple wireless devices, where the set of default operating frequency priorities includes the default operating frequency priority of the second wireless device.

Aspect 31: The method of any of aspects 28-30, further including: selecting the default operating frequency for the wireless communications system based on a set of default operating frequencies including a respective default operating frequency associated with each wireless device of the set of multiple wireless devices, where the set of default operating frequencies includes the default operating frequency of the second wireless device.

Aspect 32: The method of any of aspects 21-31, further including: assigning the default operating frequency priority of the second wireless device to at least the second wireless device.

Aspect 33: The method of aspect 32, where the default operating frequency priority of the second wireless device corresponds to a capability of the second wireless device.

Aspect 34: A method for wireless communications, including: transmitting a capability message to a first wireless device in a wireless communications system, the capability message indicating a default operating frequency of a second wireless device, a default operating frequency priority of the second wireless device, or both; and receiving, from the first wireless device, an indication of one or more codebook parameters associated with the capability message, the one or more codebook parameters indicating a default operating frequency for the wireless communications system.

Aspect 35: The method of aspect 34, further including: transmitting one or more reports to the first wireless device, the one or more reports indicating a signal to noise ratio for one or more frequencies.

Aspect 36: The method of aspect 35, further including: receiving control signaling to at least the second wireless device, the control signaling configuring the one or more frequencies associated with the one or more reports.

Aspect 37: The method of any of aspects 34-36, further including: determining the one or more codebook parameters based on receiving the indication.

Aspect 38: The method of any of aspects 34-37, further including: adjusting a first default operating frequency of the second wireless device to the default operating frequency for the wireless communications system based on receiving the indication.

Aspect 39: The method of any of aspects 34-38, further including: communicating with the first wireless device in accordance with the one or more codebook parameters, where the communicating further includes: communicating using the default operating frequency for the wireless communications system.

Aspect 40: The method of any of aspects 34-39, further including: receiving a request for the capability message from the first wireless device, where transmitting the capability message is based on the request for the capability message.

Aspect 41: An apparatus for wireless communications at a first wireless device, including: a processor; memory coupled with the processor; and instructions stored in the memory and executable by the processor to cause the apparatus to: receive, at the first wireless device, a capability message from at least a second wireless device in a wireless communications system, the capability message indicating a default operating frequency of the second wireless device, a default operating frequency priority of the second wireless device, or both; select one or more codebook parameters associated with the capability message, the one or more codebook parameters indicating a default operating frequency for the wireless communications system; and transmit, to at least the second wireless device, an indication of the one or more codebook parameters.

Aspect 42: The apparatus of aspect 41, where the instructions are further executable by the processor to cause the apparatus to: receive one or more reports from at least the second wireless device, the one or more reports indicating a signal to noise ratio for one or more frequencies.

Aspect 43: The apparatus of aspect 42, where the capability message includes the one or more reports from at least the second wireless device.

Aspect 44: The apparatus of any of aspects 42-43, where the instructions are further executable by the processor to cause the apparatus to: transmit control signaling to at least the second wireless device, the control signaling configuring the one or more frequencies associated with the one or more reports.

Aspect 45: The apparatus of any of aspects 41-44, where the instructions are further executable by the processor to cause the apparatus to: communicate with at least the second wireless device in accordance with the one or more codebook parameters, where the communicating further includes: communicating using the default operating frequency for the wireless communications system.

Aspect 46: The apparatus of any of aspects 41-45, where the instructions are further executable by the processor to cause the apparatus to: adjust a first default operating frequency of the first wireless device to the default operating frequency for the wireless communications system based on the one or more codebook parameters.

Aspect 47: The apparatus of any of aspects 41-46, where the instructions are further executable by the processor to cause the apparatus to: transmit a request for the capability message to at least the second wireless device, where receiving the capability message is based on transmitting the request.

Aspect 48: The apparatus of any of aspects 41-47, where the instructions are further executable by the processor to cause the apparatus to: receive a set of multiple capability messages from a set of multiple wireless devices, the set of multiple capability messages including the capability message from the second wireless device.

Aspect 49: The apparatus of aspect 48, where the instructions are further executable by the processor to cause the apparatus to: select the default operating frequency for the wireless communications system based on a majority of the set of multiple capability messages indicating the default operating frequency for the wireless communications system.

Aspect 50: The apparatus of any of aspects 48-49, where the instructions are further executable by the processor to cause the apparatus to: select the default operating frequency for the wireless communications system based on a set of default operating frequency priorities including a respective operating frequency priority associated with each wireless device of the set of multiple wireless devices, where the set of default operating frequency priorities includes the default operating frequency priority of the second wireless device.

Aspect 51: The apparatus of any of aspects 48-50, where the instructions are further executable by the processor to cause the apparatus to: select the default operating frequency for the wireless communications system based on a set of default operating frequencies including a respective default operating frequency associated with each wireless device of the set of multiple wireless devices, where the set of default operating frequencies includes the default operating frequency of the second wireless device.

Aspect 52: The apparatus of any of aspects 41-51, where the instructions are further executable by the processor to cause the apparatus to: assign the default operating frequency priority of the second wireless device to at least the second wireless device.

Aspect 53: The apparatus of aspect 52, where the default operating frequency priority of the second wireless device corresponds to a capability of the second wireless device.

Aspect 54: An apparatus for wireless communications at a second wireless device, including: a processor; memory coupled with the processor; and instructions stored in the memory and executable by the processor to cause the apparatus to: transmit a capability message to a first wireless device in a wireless communications system, the capability message indicating a default operating frequency of the second wireless device, a default operating frequency priority of the second wireless device, or both; and receive, from the first wireless device, an indication of one or more codebook parameters associated with the capability message, the one or more codebook parameters indicating a default operating frequency for the wireless communications system.

Aspect 55: The apparatus of aspect 54, where the instructions are further executable by the processor to cause the apparatus to: transmit one or more reports to the first wireless device, the one or more reports indicating a signal to noise ratio for one or more frequencies.

Aspect 56: The apparatus of aspect 55, where the instructions are further executable by the processor to cause the apparatus to: receive control signaling to at least the second wireless device, the control signaling configuring the one or more frequencies associated with the one or more reports.

Aspect 57: The apparatus of any of aspects 54-56, where the instructions are further executable by the processor to cause the apparatus to: determine the one or more codebook parameters based on receiving the indication.

Aspect 58: The apparatus of any of aspects 54-57, where the instructions are further executable by the processor to cause the apparatus to: adjust a first default operating frequency of the second wireless device to the default operating frequency for the wireless communications system based on receiving the indication.

Aspect 59: The apparatus of any of aspects 54-58, where the instructions are further executable by the processor to cause the apparatus to: communicate with the first wireless device in accordance with the one or more codebook parameters, where the communicating further includes: communicating using the default operating frequency for the wireless communications system.

Aspect 60: The apparatus of any of aspects 54-59, where the instructions are further executable by the processor to cause the apparatus to: receive a request for the capability message from the first wireless device, where transmitting the capability message is based on the request for the capability message.

Aspect 61: An apparatus for wireless communications, including: means for receiving, at a first wireless device, a capability message from at least a second wireless device in a wireless communications system, the capability message indicating a default operating frequency of the second wireless device, a default operating frequency priority of the second wireless device, or both; means for selecting one or more codebook parameters associated with the capability message, the one or more codebook parameters indicating a default operating frequency for the wireless communications system; and means for transmitting, to at least the second wireless device, an indication of the one or more codebook parameters.

Aspect 62: The apparatus of aspect 61, further including: means for receiving one or more reports from at least the second wireless device, the one or more reports indicating a signal to noise ratio for one or more frequencies.

Aspect 63: The apparatus of aspect 62, where the capability message includes the one or more reports from at least the second wireless device.

Aspect 64: The apparatus of any of aspects 62-63, further including: means for transmitting control signaling to at least the second wireless device, the control signaling configuring the one or more frequencies associated with the one or more reports.

Aspect 65: The apparatus of any of aspects 61-64, further including: means for communicating with at least the second wireless device in accordance with the one or more codebook parameters, where the means for communicating further includes: means for communicating using the default operating frequency for the wireless communications system.

Aspect 66: The apparatus of any of aspects 61-65, further including: means for adjusting a first default operating frequency of the first wireless device to the default operating frequency for the wireless communications system based on the one or more codebook parameters.

Aspect 67: The apparatus of any of aspects 61-66, further including: means for transmitting a request for the capability message to at least the second wireless device, where receiving the capability message is based on transmitting the request.

Aspect 68: The apparatus of any of aspects 61-67, further including: means for receiving a set of multiple capability messages from a set of multiple wireless devices, the set of multiple capability messages including the capability message from the second wireless device.

Aspect 69: The apparatus of aspect 68, further including: means for selecting the default operating frequency for the wireless communications system based on a majority of the set of multiple capability messages indicating the default operating frequency for the wireless communications system.

Aspect 70: The apparatus of any of aspects 68-69, further including: means for selecting the default operating frequency for the wireless communications system based on a set of default operating frequency priorities including a respective operating frequency priority associated with each wireless device of the set of multiple wireless devices, where the set of default operating frequency priorities includes the default operating frequency priority of the second wireless device.

Aspect 71: The apparatus of any of aspects 68-70, further including: means for selecting the default operating frequency for the wireless communications system based on a set of default operating frequencies including a respective default operating frequency associated with each wireless device of the set of multiple wireless devices, where the set of default operating frequencies includes the default operating frequency of the second wireless device.

Aspect 72: The apparatus of any of aspects 61-71, further including: means for assigning the default operating frequency priority of the second wireless device to at least the second wireless device.

Aspect 73: The apparatus of aspect 72, where the default operating frequency priority of the second wireless device corresponds to a capability of the second wireless device.

Aspect 74: An apparatus for wireless communications, including: means for transmitting a capability message to a first wireless device in a wireless communications system, the capability message indicating a default operating frequency of a second wireless device, a default operating frequency priority of the second wireless device, or both; and means for receiving, from the first wireless device, an indication of one or more codebook parameters associated with the capability message, the one or more codebook parameters indicating a default operating frequency for the wireless communications system.

Aspect 75: The apparatus of aspect 74, further including: means for transmitting one or more reports to the first wireless device, the one or more reports indicating a signal to noise ratio for one or more frequencies.

Aspect 76: The apparatus of aspect 75, further including: means for receiving control signaling to at least the second wireless device, the control signaling configuring the one or more frequencies associated with the one or more reports.

Aspect 77: The apparatus of any of aspects 74-76, further including: means for determining the one or more codebook parameters based on receiving the indication.

Aspect 78: The apparatus of any of aspects 74-77, further including: means for adjusting a first default operating frequency of the second wireless device to the default operating frequency for the wireless communications system based on receiving the indication.

Aspect 79: The apparatus of any of aspects 74-78, further including: means for communicating with the first wireless device in accordance with the one or more codebook parameters, where the means for communicating further includes: means for communicating using the default operating frequency for the wireless communications system.

Aspect 80: The apparatus of any of aspects 74-79, further including: means for receiving a request for the capability message from the first wireless device, where transmitting the capability message is based on the request for the capability message.

Aspect 81: A non-transitory computer-readable medium storing code for wireless communications, the code including instructions executable by a processor to: receive, at a first wireless device, a capability message from at least a second wireless device in a wireless communications system, the capability message indicating a default operating frequency of the second wireless device, a default operating frequency priority of the second wireless device, or both; select one or more codebook parameters associated with the capability message, the one or more codebook parameters indicating a default operating frequency for the wireless communications system; and transmit, to at least the second wireless device, an indication of the one or more codebook parameters.

Aspect 82: The non-transitory computer-readable medium of aspect 81, where the instructions are further executable by the processor to: receive one or more reports from at least the second wireless device, the one or more reports indicating a signal to noise ratio for one or more frequencies.

Aspect 83: The non-transitory computer-readable medium of aspect 82, where the capability message includes the one or more reports from at least the second wireless device.

Aspect 84: The non-transitory computer-readable medium of any of aspects 82-83, where the instructions are further executable by the processor to: transmit control signaling to at least the second wireless device, the control signaling configuring the one or more frequencies associated with the one or more reports.

Aspect 85: The non-transitory computer-readable medium of any of aspects 81-84, where the instructions are further executable by the processor to: communicate with at least the second wireless device in accordance with the one or more codebook parameters, where the communicating further includes: communicating using the default operating frequency for the wireless communications system.

Aspect 86: The non-transitory computer-readable medium of any of aspects 81-85, where the instructions are further executable by the processor to: adjust a first default operating frequency of the first wireless device to the default operating frequency for the wireless communications system based on the one or more codebook parameters.

Aspect 87: The non-transitory computer-readable medium of any of aspects 81-86, where the instructions are further executable by the processor to: transmit a request for the capability message to at least the second wireless device, where receiving the capability message is based on transmitting the request.

Aspect 88: The non-transitory computer-readable medium of any of aspects 81-87, where the instructions are further executable by the processor to: receive a set of multiple capability messages from a set of multiple wireless devices, the set of multiple capability messages including the capability message from the second wireless device.

Aspect 89: The non-transitory computer-readable medium of aspect 88, where the instructions are further executable by the processor to: select the default operating frequency for the wireless communications system based on a majority of the set of multiple capability messages indicating the default operating frequency for the wireless communications system.

Aspect 90: The non-transitory computer-readable medium of any of aspects 88-89, where the instructions are further executable by the processor to: select the default operating frequency for the wireless communications system based on a set of default operating frequency priorities including a respective operating frequency priority associated with each wireless device of the set of multiple wireless devices, where the set of default operating frequency priorities includes the default operating frequency priority of the second wireless device.

Aspect 91: The non-transitory computer-readable medium of any of aspects 88-90, where the instructions are further executable by the processor to: select the default operating frequency for the wireless communications system based on a set of default operating frequencies including a respective default operating frequency associated with each wireless device of the set of multiple wireless devices, where the set of default operating frequencies includes the default operating frequency of the second wireless device.

Aspect 92: The non-transitory computer-readable medium of any of aspects 81-91, where the instructions are further executable by the processor to: assign the default operating frequency priority of the second wireless device to at least the second wireless device.

Aspect 93: The non-transitory computer-readable medium of aspect 92, where the default operating frequency priority of the second wireless device corresponds to a capability of the second wireless device.

Aspect 94: A non-transitory computer-readable medium storing code for wireless communications, the code including instructions executable by a processor to: transmit a capability message to a first wireless device in a wireless communications system, the capability message indicating a default operating frequency of a second wireless device, a default operating frequency priority of the second wireless device, or both; and receive, from the first wireless device, an indication of one or more codebook parameters associated with the capability message, the one or more codebook parameters indicating a default operating frequency for the wireless communications system.

Aspect 95: The non-transitory computer-readable medium of aspect 94, where the instructions are further executable by the processor to: transmit one or more reports to the first wireless device, the one or more reports indicating a signal to noise ratio for one or more frequencies.

Aspect 96: The non-transitory computer-readable medium of aspect 95, where the instructions are further executable by the processor to: receive control signaling to at least the second wireless device, the control signaling configuring the one or more frequencies associated with the one or more reports.

Aspect 97: The non-transitory computer-readable medium of any of aspects 94-96, where the instructions are further executable by the processor to: determine the one or more codebook parameters based on receiving the indication.

Aspect 98: The non-transitory computer-readable medium of any of aspects 94-97, where the instructions are further executable by the processor to: adjust a first default operating frequency of the second wireless device to the default operating frequency for the wireless communications system based on receiving the indication.

Aspect 99: The non-transitory computer-readable medium of any of aspects 94-98, where the instructions are further executable by the processor to: communicate with the first wireless device in accordance with the one or more codebook parameters, where the communicating further includes: communicating using the default operating frequency for the wireless communications system.

Aspect 100: The non-transitory computer-readable medium of any of aspects 94-99, where the instructions are further executable by the processor to: receive a request for the capability message from the first wireless device, where transmitting the capability message is based on the request for the capability message.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a set of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above also may be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in certain combinations and even initially claimed as such, one or more features from a claimed combination can in some implementations be excised from the combination, and the claimed combination may be directed to a subcombination or variation of a subcombination.

Similarly, while operations are depicted in the drawings in a particular order, this may not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described herein may not be understood as requiring such separation in all implementations, and it may be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. An apparatus for wireless communication at a first wireless device, comprising:
one or more memories storing processor-executable code; and
one or more processors coupled with the one or more memories and individually or collectively operable to execute the code to cause the first wireless device to:
receive a capability message from at least a second wireless device in a wireless communications system, the capability message comprising one or more indications of respective signal quality measurements for one or more frequencies;
select one or more codebook parameters associated with the capability message, the one or more codebook parameters indicating a default operating frequency for the wireless communications system; and
transmit, to at least the second wireless device, an indication of the one or more codebook parameters.

2. The apparatus of claim 1, wherein, to receive the capability message, the one or more processors are individually or collectively operable to execute the code to cause the first wireless device to:
receive, from at least the second wireless device, one or more reports that comprise the one or more indications of the respective signal quality measurements for the one or more frequencies.

3. The apparatus of claim 1, wherein the one or more processors are individually or collectively further operable to execute the code to cause the first wireless device to:
transmit, to at least the second wireless device, control signaling that configures the one or more frequencies, the one or more frequencies comprising one or more sample frequencies over an ultra-wide bandwidth, receiving the capability message is in accordance with transmitting the control signaling.

4. The apparatus of claim 1, wherein, to receive the capability message, the one or more processors are individually or collectively operable to execute the code to cause the first wireless device to:
receive a default operating frequency of the second wireless device, a default operating frequency priority of the second wireless device, or both.

5. The apparatus of claim 4, wherein the one or more processors are individually or collectively further operable to execute the code to cause the first wireless device to:
assign the default operating frequency priority of the second wireless device to at least the second wireless device.

6. The apparatus of claim 1, wherein the one or more processors are individually or collectively further operable to execute the code to cause the first wireless device to:
communicate with at least the second wireless device in accordance with the one or more codebook parameters using the default operating frequency for the wireless communications system.

7. The apparatus of claim 1, wherein the one or more processors are individually or collectively further operable to execute the code to cause the first wireless device to:
adjust a first default operating frequency of the first wireless device to the default operating frequency for the wireless communications system in accordance with the one or more codebook parameters.

8. The apparatus of claim 1, wherein the one or more processors are individually or collectively further operable to execute the code to cause the first wireless device to:
transmit a request for the capability message to at least the second wireless device, receiving the capability message is associated at least in part with transmitting the request.

9. The apparatus of claim 1, wherein the respective signal quality measurements for the one or more frequencies comprises one or more reference signal received power (RSRP) values, one or more reference signal received quality (RSRQ) values, one or more received signal strength indicator (RSSI) values, one or more signal to noise ratio (SNR) values, one or more signal to interference plus noise ratio (SINR) values, or a combination thereof.

10. The apparatus of claim 1, wherein the one or more processors are individually or collectively further operable to execute the code to cause the first wireless device to:
receive a plurality of capability messages from a plurality of wireless devices, the plurality of capability messages comprising the capability message from the second wireless device, each capability message of the plurality of capability messages comprises a respective one or more indications of respective signal quality measurements for the one or more frequencies.

11. The apparatus of claim 10, wherein the one or more processors are individually or collectively further operable to execute the code to cause the first wireless device to:
select the default operating frequency for the wireless communications system in accordance with the plurality of capability messages and a plurality of default operating frequency priorities comprising a respective operating frequency priority associated with each wireless device of the plurality of wireless devices.

12. The apparatus of claim 10, wherein the first wireless device comprises a network entity and the plurality of wireless devices comprises one or more user equipments (UEs), one or more customer-premises equipments (CPEs), one or more infra nodes, or a combination thereof.

13. The apparatus of claim 10, wherein the first wireless device comprises a user equipment (UE) or a customer-premises equipment (CPE) and the plurality of wireless devices comprises a one or more UEs, one or more network entities, one or more infra nodes, or a combination thereof.

14. An apparatus for wireless communication at a second wireless device, comprising:
one or more memories storing processor-executable code; and
one or more processors coupled with the one or more memories and individually or collectively operable to execute the code to cause the second wireless device to:
transmit a capability message to a first wireless device in a wireless communications system, the capability message comprising one or more indications of respective signal quality measurements for one or more frequencies; and
receive, from the first wireless device, an indication of one or more codebook parameters associated with the capability message, the one or more codebook parameters indicating a default operating frequency for the wireless communications system.

15. The apparatus of claim 14, wherein, to transmit the capability message, the one or more processors are individually or collectively operable to execute the code to cause the second wireless device to:
transmit one or more reports comprising the one or more indications of the respective signal quality measurements for the one or more frequencies.

16. The apparatus of claim 14, wherein the one or more processors are individually or collectively further operable to execute the code to cause the second wireless device to:
receive control signaling configuring the one or more frequencies, the one or more frequencies comprising one or more sample frequencies over an ultra-wide bandwidth, transmitting the capability message is in accordance with transmitting the control signaling.

17. The apparatus of claim 14, wherein, to transmit the capability message, the one or more processors are individually or collectively operable to execute the code to cause the second wireless device to:
transmit a default operating frequency of the second wireless device, a default operating frequency priority of the second wireless device, or both.

18. The apparatus of claim 14, wherein the one or more processors are individually or collectively further operable to execute the code to cause the second wireless device to:
communicate with the first wireless device in accordance with the one or more codebook parameters using the default operating frequency for the wireless communications system.

19. The apparatus of claim 14, wherein the one or more processors are individually or collectively further operable to execute the code to cause the second wireless device to:
adjust a first default operating frequency of the second wireless device to the default operating frequency for the wireless communications system in accordance with the one or more codebook parameters.

20. The apparatus of claim 14, wherein the one or more processors are individually or collectively further operable to execute the code to cause the second wireless device to:
receive a request for the capability message to at least the second wireless device, transmitting the capability message is associated at least in part with receiving the request.

21. The apparatus of claim 14, wherein the respective signal quality measurements for the one or more frequencies comprises one or more reference signal received power (RSRP) values, one or more reference signal received quality (RSRQ) values, one or more received signal strength indicator (RSSI) values, one or more signal to noise ratio (SNR) values, one or more signal to interference plus noise ratio (SINR) values, or a combination thereof.

22. The apparatus of claim 14, wherein the first wireless device comprises a network entity and the second wireless device comprises one of a user equipment (UE), a customer-premises equipments (CPEs), or an infra node.

23. The apparatus of claim 14, wherein the first wireless device comprises a first user equipment (UE) or a customer-premises equipment (CPE) and the second wireless device comprises one of a second UE, a network entity, or an infra node.

24. A method for wireless communications, at a first wireless device, comprising:
receiving a capability message from at least a second wireless device in a wireless communications system, the capability message comprising one or more indications of respective signal quality measurements for one or more frequencies;
selecting one or more codebook parameters associated with the capability message, the one or more codebook parameters indicating a default operating frequency for the wireless communications system; and
transmitting, to at least the second wireless device, an indication of the one or more codebook parameters.

25. The method of claim 24, wherein receiving the capability message comprises:
receiving, from at least the second wireless device, one or more reports comprising the one or more indications of the respective signal quality measurements for the one or more frequencies.

26. The method of claim 24, further comprising:
transmitting, to at least the second wireless device, control signaling configuring the one or more frequencies, the one or more frequencies comprising one or more sample frequencies over an ultra-wide bandwidth, receiving the capability message is in accordance with transmitting the control signaling.

27. The method of claim 24, wherein receiving the capability message comprises:
receiving a default operating frequency of the second wireless device, a default operating frequency priority of the second wireless device, or both.

28. The method of claim 27, further comprising:
assigning the default operating frequency priority of the second wireless device to at least the second wireless device.

29. The method of claim 24, further comprising:
communicating with at least the second wireless device in accordance with the one or more codebook parameters using the default operating frequency for the wireless communications system.

30. A method for wireless communications, at a second wireless device, comprising:
transmitting a capability message to a first wireless device in a wireless communications system, the capability message comprising one or more indications of respective signal quality measurements for one or more frequencies; and
receiving, from the first wireless device, an indication of one or more codebook parameters associated with the capability message, the one or more codebook parameters indicating a default operating frequency for the wireless communications system.

* * * * *